(12) United States Patent
Yanai

(10) Patent No.: US 9,065,375 B2
(45) Date of Patent: Jun. 23, 2015

(54) ELECTRIC POWER STEERING DEVICE

(75) Inventor: Kohei Yanai, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 59 days.

(21) Appl. No.: 13/991,992

(22) PCT Filed: Mar. 17, 2011

(86) PCT No.: PCT/JP2011/056342
§ 371 (c)(1),
(2), (4) Date: Jun. 6, 2013

(87) PCT Pub. No.: WO2012/124098
PCT Pub. Date: Sep. 20, 2012

(65) Prior Publication Data
US 2013/0342148 A1    Dec. 26, 2013

(51) Int. Cl.
*H02P 29/00*    (2006.01)
*B62D 5/04*    (2006.01)

(52) U.S. Cl.
CPC .......... *H02P 29/0088* (2013.01); *B62D 5/0484* (2013.01); *B62D 5/0487* (2013.01)

(58) Field of Classification Search
CPC ......... G06F 1/206; B62D 5/0463; G05B 5/01
USPC ......... 318/472, 432, 609, 798, 806, 807, 727, 318/139; 381/610
See application file for complete search history.

(56) References Cited

U.S. PATENT DOCUMENTS 4,789,040 A    12/1988  Morishita et al.
7,240,761 B2 *  7/2007  Nagase et al. ............... 180/443

FOREIGN PATENT DOCUMENTS

| JP | A-62-292576 | 12/1987 |
| JP | A-11-286278 | 10/1999 |
| JP | A-2000-72006 | 3/2000 |
| JP | A-2009-46006 | 3/2009 |
| JP | A-2009-51255 | 3/2009 |
| JP | A-2009-56849 | 3/2009 |
| JP | A-2010-23821 | 2/2010 |

* cited by examiner

*Primary Examiner* — Karen Masih
(74) *Attorney, Agent, or Firm* — Oliff PLC

(57) ABSTRACT

A microcomputer calculates an internal resistance value of a motor, and subsequently calculates an internal resistance value of a switching element of a motor drive circuit. When the internal resistance value of the motor is a semi-abnormal value, the microcomputer sets an upper limit current. When the internal resistance value of the motor drive circuit is a semi-abnormal value, the microcomputer sets an upper limit current. The microcomputer sets a smaller one of the upper limit current and the upper limit current as an upper limit current of the motor. In this manner, the progress of degradation of the motor and the motor drive circuit can be suppressed.

14 Claims, 24 Drawing Sheets

(a)   (b)

(a)

(b)

ELECTRIC POWER STEERING DEVICE

TECHNICAL FIELD

The present invention relates to an electric power steering device for generating a steering assist torque by driving a motor based on a driver's steering operation.

BACKGROUND ART

An electric power steering device includes a motor for generating a steering assist torque that assists a steering operation of a steering wheel, and an electronic control unit (hereinafter referred to as "ECU") for controlling the energization of the motor. The ECU includes a motor drive circuit formed of switching elements, a microcomputer for calculating a control amount of the motor so as to generate a target assist torque corresponding to a steering torque, and a switch drive circuit for outputting a PWM-controlled gate signal to the switching elements of the motor drive circuit in accordance with the control amount calculated by the microcomputer.

This kind of electric power steering device prevents the motor and the motor drive circuit from being damaged by heat generation in a manner that detects temperatures thereof and limits a current to be supplied to the motor when the detected temperature exceeds a threshold set for overheat prevention. In an electric power steering device proposed in Patent Literature 1, the temperature of the switch drive circuit is detected as well, and the current to be supplied to the motor is limited when any one of the temperatures detected from the motor drive circuit and the switch drive circuit exceeds a threshold set for each circuit.

CITATION LIST

Patent Literature

[PTL 1] JP 2009-56849 A

SUMMARY OF INVENTION

Technical Problem

In the conventional electric power steering device, however, although the heat-generating states of the motor and the motor drive circuit can be detected, it cannot be determined whether or not the heat generation is caused by increased internal resistances of the motor and the motor drive circuit. The current to be supplied to the motor is limited based merely on the phenomenon of the temperature increase. For example, the amount of heat generation increases when a contact resistance of a brush portion of the motor or an internal resistance of the switching element of the motor drive circuit increases, but the heat generation in this case is not discriminated from heat generation occurring when the internal resistance is normal.

Accordingly, the steering assist suddenly stops when the internal resistance of the motor or the motor drive circuit has increased to cause an abnormality (for example, the breakdown of the switching element). This is because the conventional electric power steering device takes no consideration of control in a semi-abnormal state of the internal resistances of the motor and the motor drive circuit, which is an intermediate process in which the internal resistances progress from a normal state to an abnormal state.

It is an object of the present invention to deal with the above-mentioned problem by detecting the semi-abnormal states of the motor and the motor drive circuit to perform steering assist control suitable for the semi-abnormal state.

In order to achieve the above-mentioned object, a feature of the present invention is to provide an electric power steering device, including: steering torque detection means (21) for detecting a steering torque input from a steering wheel; a motor (20) provided in a steering mechanism; a motor drive circuit (40) including a switching element for controlling energization of the motor; control amount calculation means (60) for calculating a control amount of the motor based on the steering torque detected by the steering torque detection means; switch control means (80) for controlling the switching element of the motor drive circuit in accordance with the control amount calculated by the control amount calculation means, thereby generating a steering assist torque from the motor; semi-abnormal state detection means (S40, S42) for detecting a semi-abnormal state in which an internal resistance value of an energization path through which a current flows to the motor via the motor drive circuit exceeds a normal range and is out of an abnormal range in which the motor is intended to be stopped; and semi-abnormal occasion control amount limiting means (S41 to S46) for limiting, when the semi-abnormal state is detected, the control amount of the motor so that the energization of the motor is limited as compared to a case where the internal resistance value falls within the normal range.

According to the present invention, the steering torque detection means detects the steering torque input from the steering wheel. The control amount calculation means calculates the control amount of the motor based on the steering torque. For example, the control amount calculation means calculates a target current based on the steering torque, and calculates a voltage control value to be applied to the motor so that the target current may flow through the motor. The switch control means controls the switching element of the motor drive circuit in accordance with the control amount calculated by the control amount calculation means. For example, the switch control means outputs a PWM control signal to the switching element of the motor drive circuit to drive the switching element. In this manner, a current flows through the motor, and a steering assist torque is generated from the motor.

If the internal resistance (electric resistance) of the motor or the motor drive circuit increases, the amount of heat generation may increase to break down a component. If the component is broken down, the motor can no longer generate the steering assist torque. To deal with this problem, the present invention includes the semi-abnormal state detection means and the semi-abnormal occasion control amount limiting means.

The semi-abnormal state detection means detects the semi-abnormal state in which the internal resistance value of the energization path through which a current flows to the motor via the motor drive circuit exceeds the normal range and is out of the abnormal range in which the motor is intended to be stopped. The energization path means a circuit through which a current flows, including the motor drive circuit and the motor. The semi-abnormal occasion control amount limiting means limits, when the semi-abnormal state is detected, the control amount of the motor so that the energization of the motor is limited as compared to the case where the internal resistance value falls within the normal range. Therefore, the heat generation of the motor and the motor drive circuit is suppressed. In this manner, the progress of degradation of the motor and the motor drive circuit can be suppressed to prolong the lifetime of the electric power steering device. Even if a failure has occurred in the motor or the motor drive circuit, the energization of the motor has already been limited before the occurrence of the failure, which can suppress a trouble that the steering assist suddenly stops to cause an abrupt change in steering force.

Another feature of the present invention is to provide an electric power steering device further including internal resistance value measurement means (S20, S30) for measuring an internal resistance value of the motor and an internal resistance value of the motor drive circuit, in which the semi-abnormal state detection means (S40, S42) is configured to detect a state in which at least one of the internal resistance value of the motor and the internal resistance value of the motor drive circuit, which are measured by the internal resistance value measurement means, becomes a semi-abnormal value that exceeds the normal range and is out of the abnormal range.

According to the present invention, the internal resistance value measurement means measures the internal resistance value of the motor and the internal resistance value of the motor drive circuit. The semi-abnormal state detection means detects, as the semi-abnormal state, the state in which at least one of the internal resistance value of the motor and the internal resistance value of the motor drive circuit, which are measured by the internal resistance value measurement means, becomes the semi-abnormal value that exceeds the normal range and is out of the abnormal range. For example, the semi-abnormal state detection means stores a first threshold that sets a maximum value of the internal resistance value in the normal range, and a second threshold that sets a minimum value of the internal resistance value in the abnormal range, and determines that the internal resistance value is in the semi-abnormal state when the measured internal resistance value is a semi-abnormal value between the first threshold and the second threshold. Therefore, the semi-abnormal state can be detected before the components of the motor and the motor drive circuit are damaged.

Another feature of the present invention is to provide an electric power steering device further including limiting degree independently setting means (S41, S43, S84, S85, S88, S89, S91, and S93) for setting a limiting degree of the energization of the motor independently for a case where the internal resistance value of the motor becomes the semi-abnormal value and a case where the internal resistance value of the motor drive circuit becomes the semi-abnormal value.

The energization limiting degree appropriate for the motor in the case where the semi-abnormal state of the motor is detected and the energization limiting degree appropriate for the motor in the case where the semi-abnormal state of the motor drive circuit is detected do not always match with each other. According to the present invention, the case where the internal resistance value of the motor becomes a semi-abnormal value and the case where the internal resistance value of the motor drive circuit becomes a semi-abnormal value can be discriminated based on the internal resistance value of the motor and the internal resistance value of the motor drive circuit. To achieve this discrimination, the limiting degree independently setting means sets the limiting degree of the energization of the motor independently for the case where the internal resistance value of the motor becomes the semi-abnormal value and the case where the internal resistance value of the motor drive circuit becomes the semi-abnormal value. In this manner, the energization of the motor can be limited appropriately for the semi-abnormal region.

Another feature of the present invention resides in that the motor is a brush DC motor, that the motor drive circuit is an H bridge circuit including: a forward rotation energization path in which a current flows when the motor is driven in a forward rotation direction; and a backward rotation energization path in which a current flows when the motor is driven in a backward rotation direction, and that the internal resistance value measurement means is configured to measure an internal resistance value of a forward rotation switching element (Q1, Q4) provided in the forward rotation energization path, an internal resistance value of a backward rotation switching element (Q2, Q3) provided in the backward rotation energization path, and the internal resistance value of the motor.

According to the present invention, the brush DC motor is driven by the H bridge circuit to generate a steering assist torque. In the case of the brush DC motor, if the contact state between a brush and a commutator segment is poor, the contact resistance increases to increase the amount of heat generation in this region, and the degradation progresses. To deal with this problem, according to the present invention, the internal resistance value measurement means measures the internal resistance value of the forward rotation switching element of the H bridge circuit, the internal resistance value of the backward rotation switching element of the H bridge circuit, and the internal resistance value of the motor. In this manner, the degradation of a brush portion of the motor and the degradation of the switching elements of the motor drive circuit can be properly detected.

Another feature of the present invention resides in that the internal resistance value measurement means (S30) is configured to alternately turn ON the forward rotation switching element and the backward rotation switching element, to measure the internal resistance value of the forward rotation switching element when the forward rotation switching element is turned ON, and measure the internal resistance value of the backward rotation switching element when the backward rotation switching element is turned ON.

When the forward rotation switching element is turned ON, the motor is driven in the forward rotation direction. When the backward rotation switching element is turned ON, the motor is driven in the backward rotation direction. It is necessary to energize the motor in order to measure the internal resistance value, but when the motor rotates, the steering wheel rotates as well. To deal with this problem, according to the present invention, the internal resistance value measurement means alternately turns ON the forward rotation switching element and the backward rotation switching element, to measure the internal resistance value of the forward rotation switching element when the forward rotation switching element is turned ON, and measure the internal resistance value of the backward rotation switching element when the backward rotation switching element is turned ON. In this manner, the steering wheel can be prevented from being rotated. Note that, the cycle of alternately turning ON the forward rotation switching element and the backward rotation switching element is set short enough not to rotate the steering wheel.

Another feature of the present invention resides in that the semi-abnormal occasion control amount limiting means (S41, S43) is configured to set an upper limit value of the current to be supplied to the motor so that the upper limit value becomes smaller as the internal resistance value measured by the internal resistance value measurement means becomes larger.

According to the present invention, the upper limit value of the current to be supplied to the motor is set to be smaller as the internal resistance value of the motor or the motor drive circuit becomes larger. Thus, the heat generation in the semi-abnormal region can be appropriately suppressed to suppress the progress of degradation.

Another feature of the present invention resides in that the semi-abnormal occasion control amount limiting means (S91, S93) is configured to set an upper limit value of a voltage to be applied to the motor so that the upper limit value becomes smaller as the internal resistance value measured by the internal resistance value measurement means becomes larger.

According to the present invention, the upper limit value of the voltage to be applied to the motor is set to be smaller as the internal resistance value of the motor or the motor drive circuit becomes larger. Thus, the heat generation in the semi-abnormal region can be appropriately suppressed to suppress the progress of degradation.

Another feature of the present invention resides in that the semi-abnormal occasion control amount limiting means (S63, S84, S88) is configured to set an upper limit value of the current to be supplied to the motor so that the upper limit value gradually decreases with time in a case where the semi-abnormal state detection means detects the semi-abnormal state.

According to the present invention, in the case where the semi-abnormal state of the motor or the motor drive circuit is detected, the upper limit value of the current to be supplied to the motor is set to gradually decrease with time. Thus, the heat generation in the semi-abnormal region can be appropriately suppressed to suppress the progress of degradation.

Another feature of the present invention resides in that the semi-abnormal occasion control amount limiting means is configured to set an upper limit value of a voltage to be applied to the motor so that the upper limit value gradually decreases with time in a case where the semi-abnormal state detection means detects the semi-abnormal state.

According to the present invention, in the case where the semi-abnormal state of the motor or the motor drive circuit is detected, the upper limit value of the voltage to be applied to the motor is set to gradually decrease with time. Thus, the heat generation in the semi-abnormal region can be appropriately suppressed to suppress the progress of degradation.

Another feature of the present invention resides in that the electric power steering device further includes time limiting means (S64, S65) for inhibiting the energization of the motor when an elapsed time from the detection of the semi-abnormal state by the semi-abnormal state detection means reaches a preset stop time.

According to the present invention, in the case where the semi-abnormal state of the motor or the motor drive circuit is detected, the energization of the motor is inhibited when the elapsed time from the detection of the semi-abnormal state reaches the preset stop time. Therefore, even when the degradation of the motor or the motor drive circuit progresses, the steering assist can be appropriately stopped.

Another feature of the present invention resides in that the electric power steering device further includes stop time setting means (S85, S89) for setting the stop time independently for a case where the internal resistance value of the motor becomes the semi-abnormal value and a case where the internal resistance value of the motor drive circuit becomes the semi-abnormal value.

The remaining lifetime from the detection of the semi-abnormal state of the motor until the motor reaches the abnormal state and the remaining lifetime from the detection of the semi-abnormal state of the motor drive circuit until the motor drive circuit reaches the abnormal state do not always match with each other. In view of this, according to the present invention, the stop time setting means sets the stop time independently for the case where the internal resistance value of the motor becomes the semi-abnormal value and the case where the internal resistance value of the motor drive circuit becomes the semi-abnormal value. Therefore, both in the case where the motor becomes the semi-abnormal state and in the case where the motor drive circuit becomes the semi-abnormal state, an appropriate stop time corresponding to each remaining lifetime can be set. In this manner, the lifetime of the electric power steering device can be appropriately prolonged.

Another feature of the present invention resides in that the internal resistance value measurement means is configured to start measuring the internal resistance value based on a door open/close signal indicating an open/close state of a vehicle door or a seating signal indicating a seating state of a driver on a driver's seat (S11).

Measuring the internal resistance value of the motor or the motor drive circuit needs to energize the motor. However, it is not preferred that the driver be aware of this operation of the motor. To deal with this problem, according to the present invention, the measurement of the internal resistance value is started based on the door open/close signal indicating the open/close state of the vehicle door or the seating signal indicating the seating state of the driver on the driver's seat. For example, the internal resistance value is measured immediately after the vehicle door is open or immediately after the driver is seated on the driver's seat. In this manner, the driver is prevented from being aware of the operation of the motor relating to the measurement of the internal resistance value.

Another feature of the present invention resides in that the internal resistance value measurement means (S30) is configured to determine an internal resistance value of the switching element by calculation based on a power supply voltage to be applied to the motor drive circuit, a motor current flowing through the motor, and respective terminal voltages of the motor or an inter-terminal voltage of the motor.

According to the present invention, the internal resistance value of the switching element is determined by calculation based on the power supply voltage to be applied to the motor drive circuit, the motor current, and the respective terminal voltages of the motor or the inter-terminal voltage of the motor. For example, the power supply voltage, the motor current, and the respective terminal voltages of the motor or the inter-terminal voltage of the motor are detected, and the detected values are used to calculate the internal resistance value of the switching element. In this case, if the power supply voltage is known, the known value may be used. Therefore, the internal resistance value of the switching element can be measured easily.

Another feature of the present invention resides in that the internal resistance value measurement means (S20) is configured to determine the internal resistance value of the motor by calculation based on a motor current flowing through the motor and an inter-terminal voltage of the motor.

According to the present invention, the internal resistance value of the motor is determined by calculation based on the motor current and the inter-terminal voltage of the motor. For example, the motor current and the inter-terminal voltage of the motor are detected, and the detected values are used to calculate the internal resistance value of the motor. In this case, the inter-terminal voltage of the motor may be detected based on a voltage difference obtained by detecting respective terminal voltages of the motor, or the inter-terminal voltage of the motor may be detected directly. Therefore, the internal resistance value of the motor can be measured easily.

For facilitating the understanding of the invention, in the above description, the configurations of the invention corresponding to the embodiment are suffixed in parentheses with symbols used in the embodiment. However, the components of the invention are not intended to be limited to the embodiment as defined by the symbols.

DESCRIPTION OF EMBODIMENTS

Figure 1:
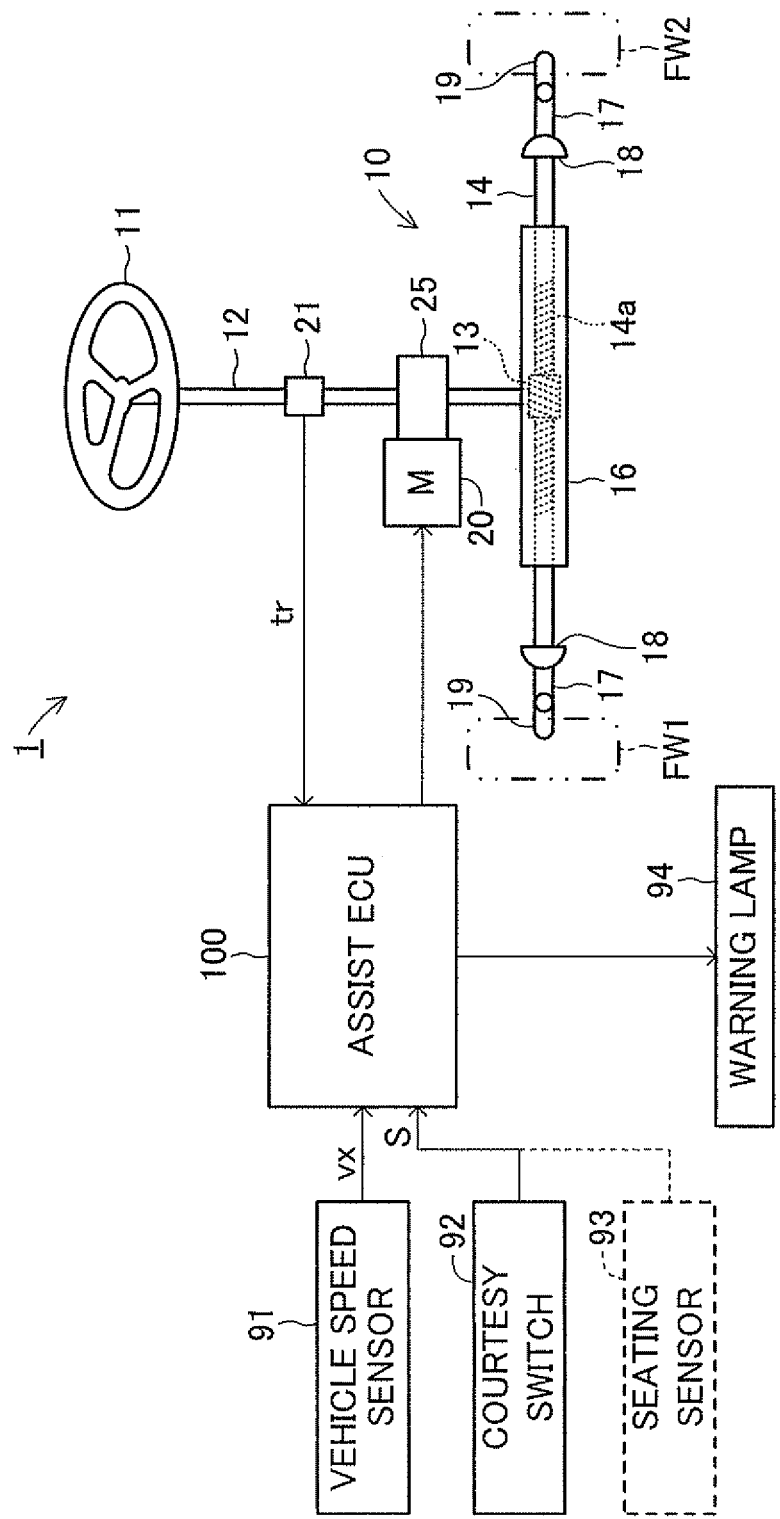
FIG. 1 A schematic configuration diagram of an electric power steering device according to an embodiment of the present invention.

Now, an electric power steering device according to an embodiment of the present invention is described below with reference to the accompanying drawings. FIG. 1 illustrates a schematic configuration of a vehicle electric power steering device 1 according to the embodiment of the present invention.

The electric power steering device 1 includes, as main components, a steering mechanism 10 for steering a steered wheel by a steering operation of a steering wheel 11, a motor 20 that is incorporated in the steering mechanism 10 to generate a steering assist torque, and an electronic control unit 100 for controlling the operation of the motor 20 in accordance with an operating state of the steering wheel 11. The electronic control unit 100 is hereinafter referred to as "assist ECU 100".

The steering mechanism 10 is a mechanism for steering front-left and front-right wheels FW1 and FW2 by a turning operation of the steering wheel 11, and includes a steering shaft 12 that is connected to the steering wheel 11 so as to be integrally rotatable, with its upper end facing the steering wheel 11. A pinion gear 13 is connected to a lower end of the steering shaft 12 so as to be integrally rotatable. The pinion gear 13 is engaged with a gear portion 14a formed in a rack bar 14, thereby constituting a rack-and-pinion mechanism together with the rack bar 14.

The gear portion 14a of the rack bar 14 is housed in a rack housing 16, and both left and right ends of the rack bar 14 are exposed from the rack housing 16 to be coupled to tie rods 17. A stopper 18 constituting a stroke end is formed at each coupling portion of the rack bar 14 with the tie rod 17. The horizontal stoke of the rack bar 14 is mechanically regulated by abutment between the stopper 18 and an end portion of the rack housing 16. The other ends of the left and right tie rods 17 are connected to knuckles 19 provided to the front-left and front-right wheels FW1 and FW2, respectively. With this configuration, the front-left and front-right wheels FW1 and FW2 are steered to the left or right in accordance with a displacement of the rack bar 14 in the direction of its axis along with the rotation of the steering shaft 12 about the direction of its axis.

The steering shaft 12 is incorporated with the motor 20 via a reduction gear 25. The motor 20 rotates to drive the steering shaft 12 to rotate about the center of the shaft via the reduction gear 25, to thereby apply an assist force to the turning operation of the steering wheel 11. The motor 20 is a brush DC motor.

The steering shaft 12 is incorporated with a steering torque sensor 21 at an intermediate position between the steering wheel 11 and the reduction gear 25. For example, the steering torque sensor 21 detects a torsion angle of a torsion bar (not shown) that is interposed at an intermediate portion of the steering shaft 12 with the use of a resolver or the like, and detects a steering torque tr acting on the steering shaft 12 based on the torsion angle. The operating direction of the steering wheel 11 is identified based on whether the steering torque tr is a positive value or a negative value. For example, the positive value indicates a steering torque tr when the steering wheel 11 is steered in the left direction, and the negative value indicates a steering torque tr when the steering wheel 11 is steered in the right direction. Note that, the torsion angle of the torsion bar is detected by the resolver in the embodiment of the present invention, but may be detected by another rotation angle sensor such as an encoder.

Next, the assist ECU 100 is described with reference to FIG. 2. The assist ECU 100 includes an electronic control circuit 50 for calculating a target control amount of the motor 20 and outputting a switch drive signal corresponding to the calculated target control amount, and a motor drive circuit 40 for energizing the motor 20 in accordance with the switch drive signal output from the electronic control circuit 50.

The electronic control circuit 50 includes a microcomputer 60 formed of a CPU, a ROM, a RAM, or the like, an input interface 70 for inputting various kinds of sensor signals and converting the input signals into signals readable by the microcomputer 60, and a switch drive circuit 80 for amplifying a switch control signal output from the microcomputer 60 and supplying the amplified switch control signal to the motor drive circuit 40.

The assist ECU 100 is supplied with electric power from a power supply device 200. The power supply device 200 includes a battery (not shown) and an alternator (not shown) for generating power by rotation of an engine. The rated output voltage of the power supply device 200 is set to, for example, 12 V. Note that, FIG. 2 illustrates only a power line 210 as a power supply line from the power supply device 200 to the motor drive circuit 40, but operating power of the electronic control circuit 50 is also supplied from the power supply device 200.

The motor drive circuit 40 is provided between the power line 210 and a ground line 220, and is formed of an H bridge circuit. In the H bridge circuit, an upper arm circuit 45H including a switching element Q1 and a switching element Q3 connected in parallel and a lower arm circuit 45L including a switching element Q2 and a switching element Q4 connected in parallel are connected in series. Energization lines 47a and 47b for supplying electric power to the motor 20 are drawn from nodes A1 and A2 between the upper arm circuit 45H and the lower arm circuit 45L, respectively. Therefore, one energization terminal 20a of the motor 20 is connected to the power line 210 via the switching element Q1, and is connected to the ground line 220 via the switching element Q2. The other energization terminal 20b of the motor 20 is connected to the power line 210 via the switching element Q3, and is connected to the ground line 220 via the switching element Q4.

As the switching elements Q1, Q2, Q3, and Q4 provided in the motor drive circuit 40, metal oxide semiconductor field effect transistors (MOS-FETs) are used. The switching elements Q1, Q2, Q3, and Q4 are provided in the upper and lower arm circuits 45H and 45L so that a power supply voltage may be applied between the source and the drain. The gates of the switching elements Q1, Q2, Q3, and Q4 are connected to the switch drive circuit 80 of the electronic control circuit 50.

Figure 2:
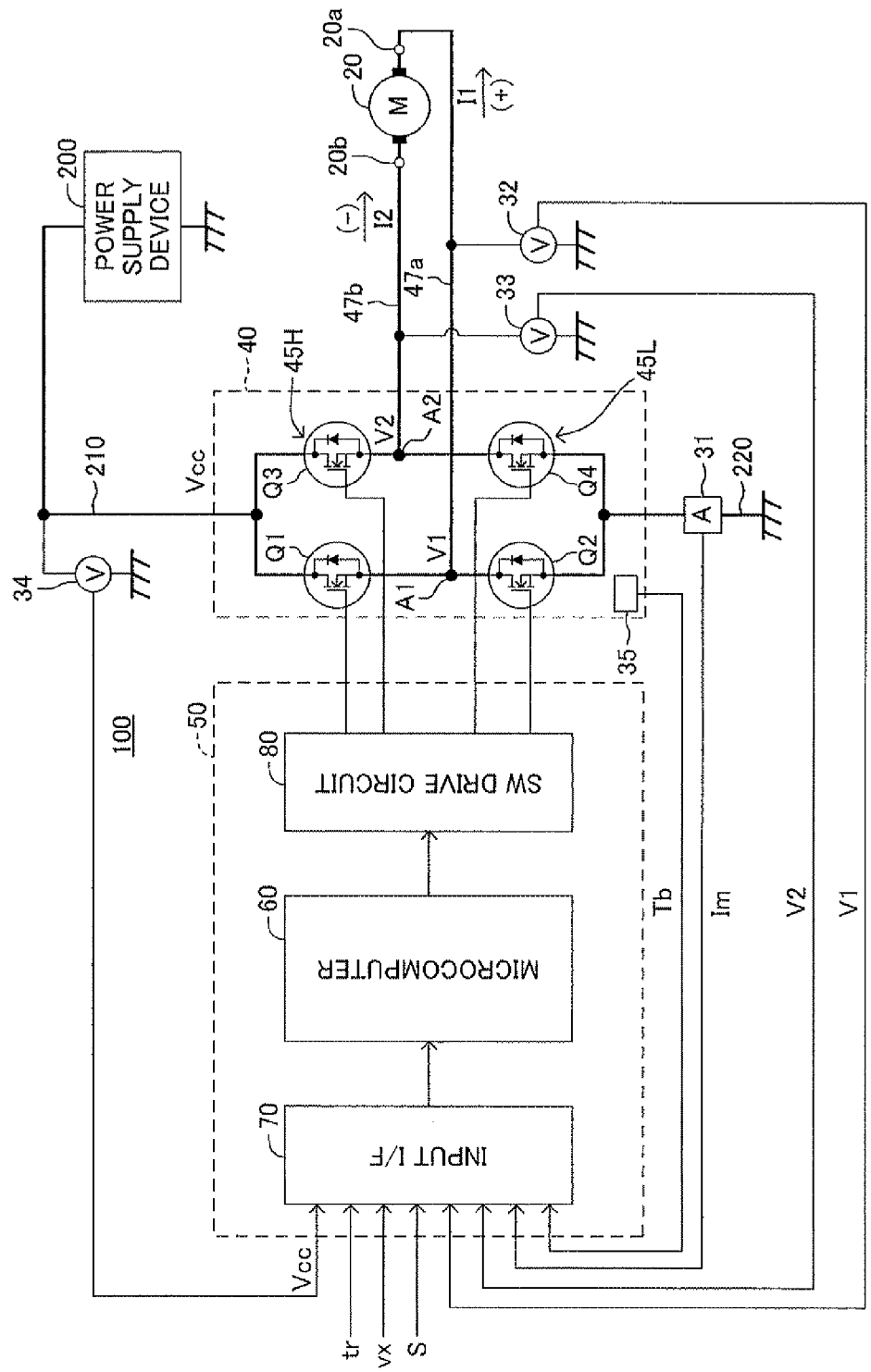
FIG. 2 A schematic configuration diagram of an assist ECU.

As illustrated by circuit symbol in FIG. 2, a diode is parasitically formed in the MOS-FET in terms of structure. This diode is referred to as "parasitic diode". Each of the parasitic diodes of the switching elements Q1, Q2, Q3, and Q4 is a reverse conducting diode for interrupting the flow of a current from the power line 210 to the ground line 220 while allowing a current to flow only from the ground line 220 to the power line 210. In the motor drive circuit 40, another reverse conducting diode than the parasitic diode (a diode for interrupting the current in the same direction as in the parasitic diode while becoming conductive in a direction reverse to the power supply voltage direction) may be connected in parallel to each of the switching elements Q1, Q2, Q3, and Q4.

The microcomputer 60 outputs an independent drive signal to each gate of the switching elements Q1, Q2, Q3, and Q4 of the motor drive circuit 40 via the switch drive circuit 80. The ON state and the OFF state of each of the switching elements Q1, Q2, Q3, and Q4 are switched by the drive signal.

In the motor drive circuit 40, when the switching element Q1 and the switching element Q4 are turned ON in a state where the switching element Q2 and the switching element Q3 are kept being turned OFF, a current I1 flows in the direction (+) of FIG. 2. In this manner, the motor 20 generates torque in the forward rotation direction. On the other hand, when the switching element Q2 and the switching element Q3 are turned ON in a state where the switching element Q1 and the switching element Q4 are kept being turned OFF, a current I2 flows in the direction (−) of FIG. 2. In this manner, the motor 20 generates torque in the backward rotation direction.

The assist ECU 100 includes a current sensor 31 for detecting the current flowing through the motor 20. The current sensor 31 is provided on the ground line 220 that connects the lower arm circuit 45L and the ground. The current sensor 31 is formed of, for example, a shunt resistor (not shown) provided on the ground line 220, and supplies a voltage signal obtained by amplifying a voltage generated across the shunt resistor by an amplifier (not shown) or a digital signal obtained by converting the voltage signal to the input interface 70 of the electronic control circuit 50. The value of the current flowing through the motor 20, which is detected by the current sensor 31, is hereinafter referred to as "motor actual current Im".

The assist ECU 100 further includes a first voltage sensor 32 and a second voltage sensor 33 for detecting terminal voltages of the motor 20. The first voltage sensor 32 supplies a signal indicating a voltage at the one energization terminal 20a of the motor 20 to the input interface 70. The value of the voltage detected by the first voltage sensor 32 is referred to as "first motor terminal voltage V1". The energization terminal 20a is referred to as "first motor terminal 20a". The first motor terminal voltage V1 indicates a potential of the node A1 between the switching element Q1 and the switching element Q2 with respect to the ground.

The second voltage sensor 33 supplies a signal indicating a voltage at the other energization terminal 20b of the motor 20 to the input interface 70. The value of the voltage detected by the second voltage sensor 33 is referred to as "second motor terminal voltage V2". The energization terminal 20b is referred to as "second motor terminal 20b". The second motor terminal voltage V2 indicates a potential of the node A2 between the switching element Q3 and the switching element Q4 with respect to the ground.

The assist ECU 100 further includes a power supply voltage sensor 34 for detecting the power supply voltage to be supplied to the motor drive circuit 40, in other words, an output voltage of the power supply device 200. The power supply voltage sensor 34 supplies a signal indicating a voltage of the power line 210 to the input interface 70. The value of the voltage detected by the power supply voltage sensor 34 is referred to as "power supply voltage Vcc".

The assist ECU 100 further includes a substrate temperature sensor 35 for detecting the temperature of the motor drive circuit 40. The substrate temperature sensor 35 supplies a signal indicating the temperature of a substrate of the motor drive circuit 40 having the switching elements Q1, Q2, Q3, and Q4 provided thereon to the input interface 70. The value of the temperature detected by the substrate temperature sensor 35 is referred to as "substrate temperature Tb". The substrate temperature Tb indicates a temperature corresponding to the heat generating states of the switching elements Q1, Q2, Q3, and Q4.

The assist ECU 100 is connected to the steering torque sensor 21, a vehicle speed sensor 91, and a courtesy switch 92. The steering torque sensor 21 supplies to the input interface 70 a detection signal indicating the steering torque tr input from the steering wheel 11. The vehicle sensor 91 supplies a detection signal indicating a vehicle speed vx to the input interface 70. The courtesy switch 92 supplies a detection signal indicating an open/close state S of a vehicle door to the input interface 70. For example, the courtesy switch 92 outputs an OFF signal when the door is closed and an ON signal when the door is open.

Figure 3:
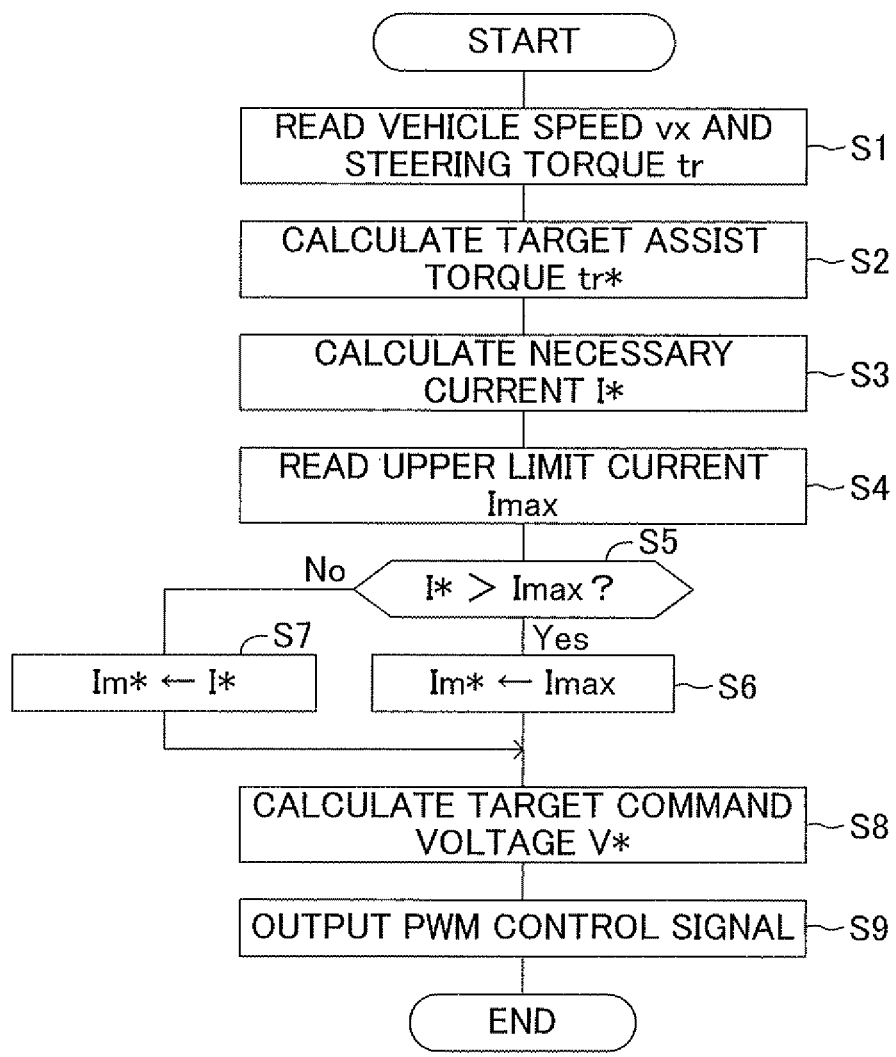
FIG. 3 A flowchart illustrating a steering assist control routine.

Description is given next of control processing of the microcomputer 60. First, steering assist control processing executed by the microcomputer 60 is described. FIG. 3 illustrates a steering assist control routine executed by the microcomputer 60. The steering assist control routine is executed repeatedly at predetermined short cycles while an ignition switch is turned ON.

Figure 4:
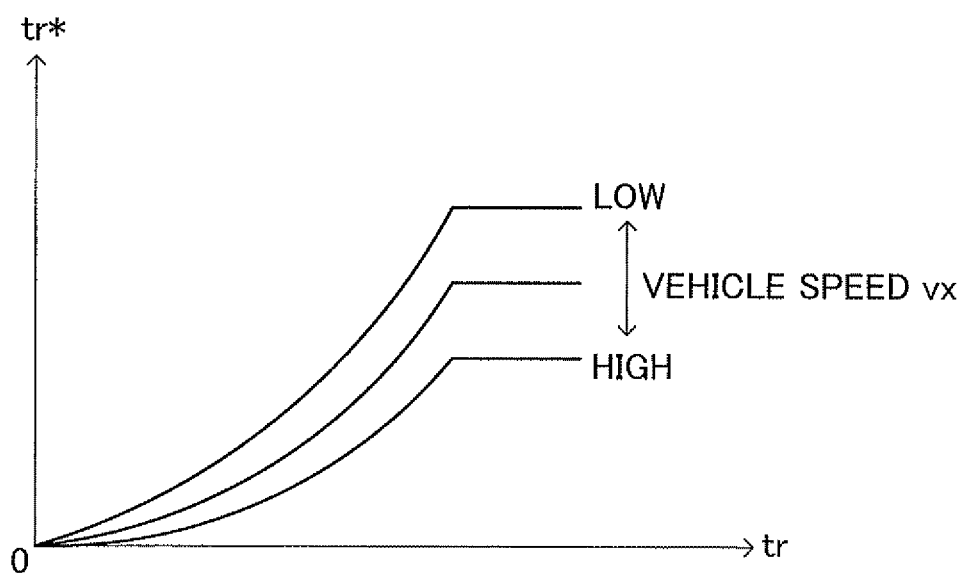
FIG. 4 A graph showing an assist map.

Upon the start of this control routine, in Step S1, the microcomputer 60 reads the vehicle speed vx detected by the vehicle speed sensor 91 and the steering torque tr detected by the steering torque sensor 21. Subsequently, in Step S2, the microcomputer 60 refers to an assist map shown in FIG. 4 to calculate a target assist torque tr* that is set in accordance with the input vehicle speed vx and the input steering torque tr. The assist map is correlation data in which the relationship between the steering torque tr and the target assist torque tr* is set for each plurality of representative vehicle speeds vx. The assist map has such characteristics that the target assist torque tr* increases as the steering torque tr becomes larger and the target assist torque tr* increases as the vehicle speed becomes lower. FIG. 4 is an assist map for steering in the left direction. An assist map for steering in the right direction is obtained by reversing the signs of the steering torque tr and the target assist torque tr* from those in the left direction (in other words, negative).

Subsequently, in Step S3, the microcomputer 60 calculates a necessary current I* that is necessary for generating the target assist torque tr*. The necessary current I* is obtained by dividing the target torque assist tr* by a torque constant. Subsequently, in Step S4, the microcomputer 60 reads an upper limit current Imax. The upper limit current Imax indicates an upper limit value of the current to be supplied to the motor 20. In Step S4, the microcomputer 60 reads the latest upper limit current Imax calculated by a motor limit value setting routine to be described later.

Subsequently, in Step S5, the microcomputer 60 determines whether or not the necessary current I* is larger than the upper limit current Imax. When the necessary current I* is larger than the upper limit current Imax, in Step S6, the microcomputer 60 sets the upper limit current Imax as a target current Im* (Im*←Imax). When the necessary current I* is equal to or smaller than the upper limit current Imax, in Step S7, the microcomputer 60 sets the necessary current I* as a target current Im* (Im*←I*). The absolute value is herein used to discuss the magnitude of a detection value with a direction (sign). Therefore, the comparison in this case is made between absolute values that are irrelevant to the flowing direction of the current.

Subsequently, in Step S8, the microcomputer 60 calculates a deviation ΔI by subtracting the motor actual current Im detected by the current sensor 31 from the target current Im*, and performs proportional-integral control (PI control) using the deviation ΔI to calculate a target command voltage V* so that the motor actual current Im may follow the target current Im*. For example, the target command voltage V* is calculated by the following expression.

$$V^* = Kp \cdot \Delta I + Ki \cdot \int \Delta I dt$$

where Kp represents a control gain of the proportional term in the PI control, and Ki represents a control gain of the integral term in the PI control.

Subsequently, in Step S9, the microcomputer 60 outputs a pulse width modulation (PWM) control signal corresponding to the target command voltage V* to the switch drive circuit 80. The switch drive circuit 80 amplifies the input control signal and outputs the amplified control signal to the motor drive circuit 40. In this manner, a pulse signal train with a duty cycle corresponding to the target command voltage V* is output to the motor drive circuit 40 as a PWM control signal. The PWM control signal controls the duty cycle of each of the switching elements Q1, Q2, Q3, and Q4 to adjust the drive voltage of the motor 20 to the target command voltage V*. In this manner, the target current Im* flows through the motor 20 in the direction for turning in the steering operation direction. As a result, the motor 20 assists the driver's steering operation.

After outputting the PWM control signal in Step S9, the microcomputer finishes the steering assist control routine once. Then, the microcomputer repeats the above-mentioned processing at predetermined cycles.

The internal resistance of the motor drive circuit 40 increases due to the deterioration of the switching elements Q1, Q2, Q3, and Q4, the deterioration of soldered parts, or other such causes. The internal resistance of the motor 20 increases due to the increase in contact resistance of a brush portion or other such causes. The increased internal resistance (electric resistance) may increase the amount of heat generation to break down a component. Once the component is broken down, the steering assist can no longer be executed. To deal with this problem, in the embodiment of the present invention, the internal resistance values of the motor 20 and the motor drive circuit 40 are measured (calculated), and, when the measured internal resistance values are out of a normal range, the energization of the motor 20 is limited in accordance with the internal resistance values. For example, a severer limitation is imposed on the energization of the motor 20 along with the increase in internal resistance value.

First, a method of measuring the internal resistance values of the motor drive circuit 40 and the motor 20 is described.

Figure 5:
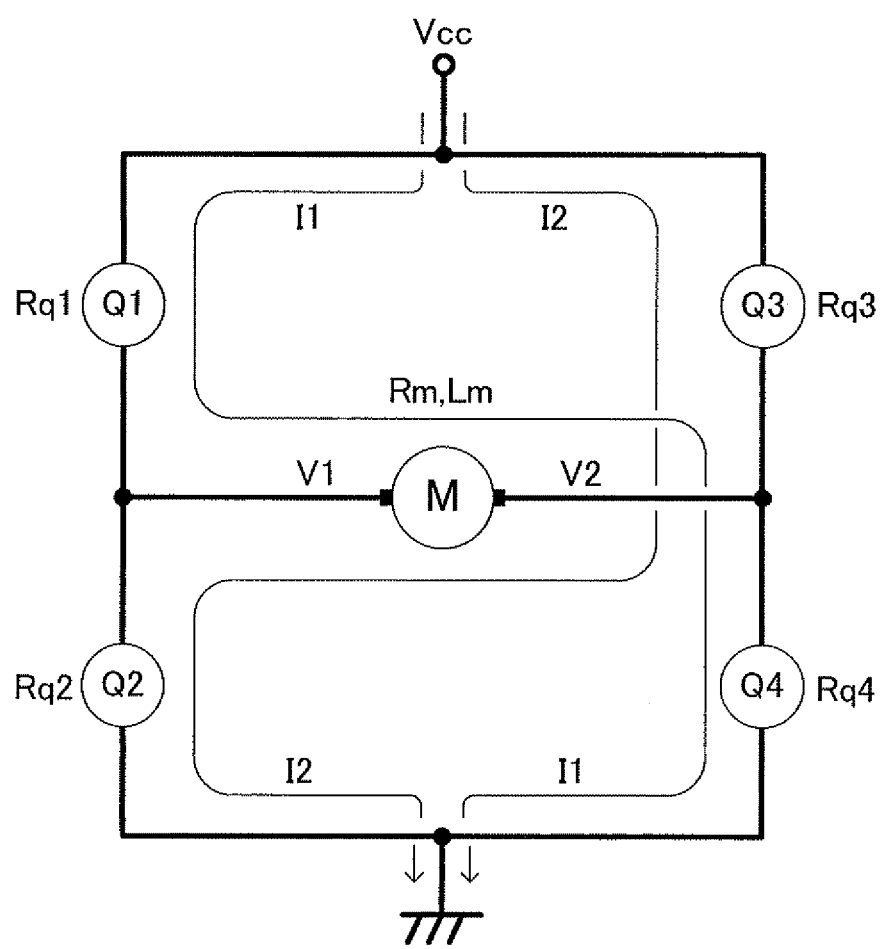
FIG. 5 An explanatory diagram illustrating a method of measuring an internal resistance value.

As illustrated in FIG. 5, an internal resistance value of the switching element Q1 is represented by Rq1; an internal resistance value of the switching element Q2, Rq2; an internal resistance value of the switching element Q3, Rq3; an internal resistance value of the switching element Q4, Rq4; an internal resistance value of the motor 20, Rm; and an inductance of the motor, Lm. A current that flows in a direction of rotating the motor 20 forward when the switching elements Q2 and Q3 are turned OFF and the switching elements Q1 and Q4 are turned ON is represented by I1. A current that flows in a direction of rotating the motor 20 backward when the switching elements Q1 and Q4 are turned OFF and the switching elements Q2 and Q3 are turned ON is represented by I2.

A voltage equation when the current I1 flows is expressed by Expression (1) below.

$$Vcc = Rq1 \cdot I1 + Rq4 \cdot I1 + (V1 - V2) \quad (1)$$
$$= (Rq1 + Rq4) \cdot I1 + (V1 - V2)$$

A voltage equation when the current I2 flows is expressed by Expression (2) below.

$$Vcc = Rq3 \cdot I2 + Rq2 \cdot I2 + (V2 - V1) \quad (2)$$
$$= (Rq3 + Rq2) \cdot I2 - (V1 - V2)$$

When the rotation speed of the motor 20 is represented by ω, an induced voltage constant of the motor 20 is represented by φ, and the current flowing through the motor 20 is represented by I (=I1 or I2), an inter-terminal voltage of the motor 20 is expressed by Expression (3) below.

$$V1-V2=Rm \cdot I+Lm \cdot dI/dt+\phi \cdot \omega \quad (3)$$

In the embodiment of the present invention, the internal resistance value Rm of the motor 20 is calculated in a manner that a DC current I1 small enough not to rotate the steering wheel 11 is caused to flow through the motor 20, and the terminal voltages V1 and V2 of the motor 20 at that time are measured. For example, the switching elements Q1 and Q4 are operated at a predetermined duty cycle to energize the motor 20 in a state where the switching elements Q2 and Q3 are kept being turned OFF. It should be understood that the switching elements Q2 and Q3 may be operated at a predetermined duty cycle to energize the motor 20 in a state where the switching elements Q1 and Q4 are kept being turned OFF.

The motor internal resistance value Rm can be obtained by Expression (4) below by substituting dI/dt=0 and ω=0 in Expression (3).

$$Rm=(V1-V2)/I \quad (4)$$

In this case, the duty cycles of the switching elements Q1 and Q4 are controlled so that the motor current I detected by the current sensor 31 may become I1, and the terminal voltages V1 and V2 of the motor 20 in this state are measured. Because the current I1 flowing through the motor 20 is set to a small value, the duty cycles of the switching elements Q1 and Q4 are also small.

Note that, in the embodiment of the present invention, the internal resistance value is obtained based on the motor inter-terminal voltage (V1−V2) obtained by subtracting the second motor terminal voltage V2 detected by the second voltage sensor 33 from the first motor terminal voltage V1 detected by the first voltage sensor 32, but, instead of the voltage sensors 32 and 33, a voltage sensor for directly detecting the voltage between the first motor terminal 20a and the second motor terminal 20b (inter-terminal voltage) may be provided.

The internal resistance values Rq1, Rq2, Rq3, and Rq4 of the switching elements Q1, Q2, Q3, and Q4 are calculated in a manner that the current is caused to flow alternately in the direction of rotating the motor 20 forward and in the direction of rotating the motor 20 backward at predetermined cycles. In this case, the motor current I1, the motor terminal voltages V1 and V2, and the power supply voltage Vcc are measured in a state where the switching elements Q2 and Q3 are turned OFF while the switching elements Q1 and Q4 are turned ON for a given period of time (for example, about several milliseconds), and the motor current I2, the motor terminal voltages V1 and V2, and the power supply voltage Vcc are thereafter measured in a state where the switching elements Q1 and Q4 are turned OFF while the switching elements Q2 and Q3 are turned ON for a given period of time (for example, about several milliseconds). In this manner, the current flows alternately in the direction of rotating the motor 20 forward and in the direction of rotating the motor 20 backward, and hence the rotation of the steering wheel 11 is prevented.

The internal resistance values of the switching elements Q1 and Q4 can be calculated by Expression (5) below based on Expression (1).

$$(Rq1+Rq4)=\{Vcc-(V1-V2)\}/I1 \quad 5)$$

The internal resistance values of the switching elements Q3 and Q2 can be calculated by Expression (6) below based on Expression (2).

$$(Rq3+Rq2)=\{Vcc+(V1-V2)\}/I2 \quad (6)$$

Alternatively, the internal resistance values of the switching elements Q1, Q3, Q2, and Q4 may be calculated by Expressions (7), (8), (9), and (10) below. In this case, the individual internal resistance values Rq1, Rq3, Rq2, and Rq4 of the switching elements Q1, Q3, Q2, and Q4 can be calculated.

$$Rq1=(Vcc-V1)/I1 \quad (7)$$

$$Rq3=(Vcc-V2)/I2 \quad (8)$$

$$Rq2=V1/I2 \quad (9)$$

$$Rq4=V2/I1 \quad (10)$$

Figure 6:
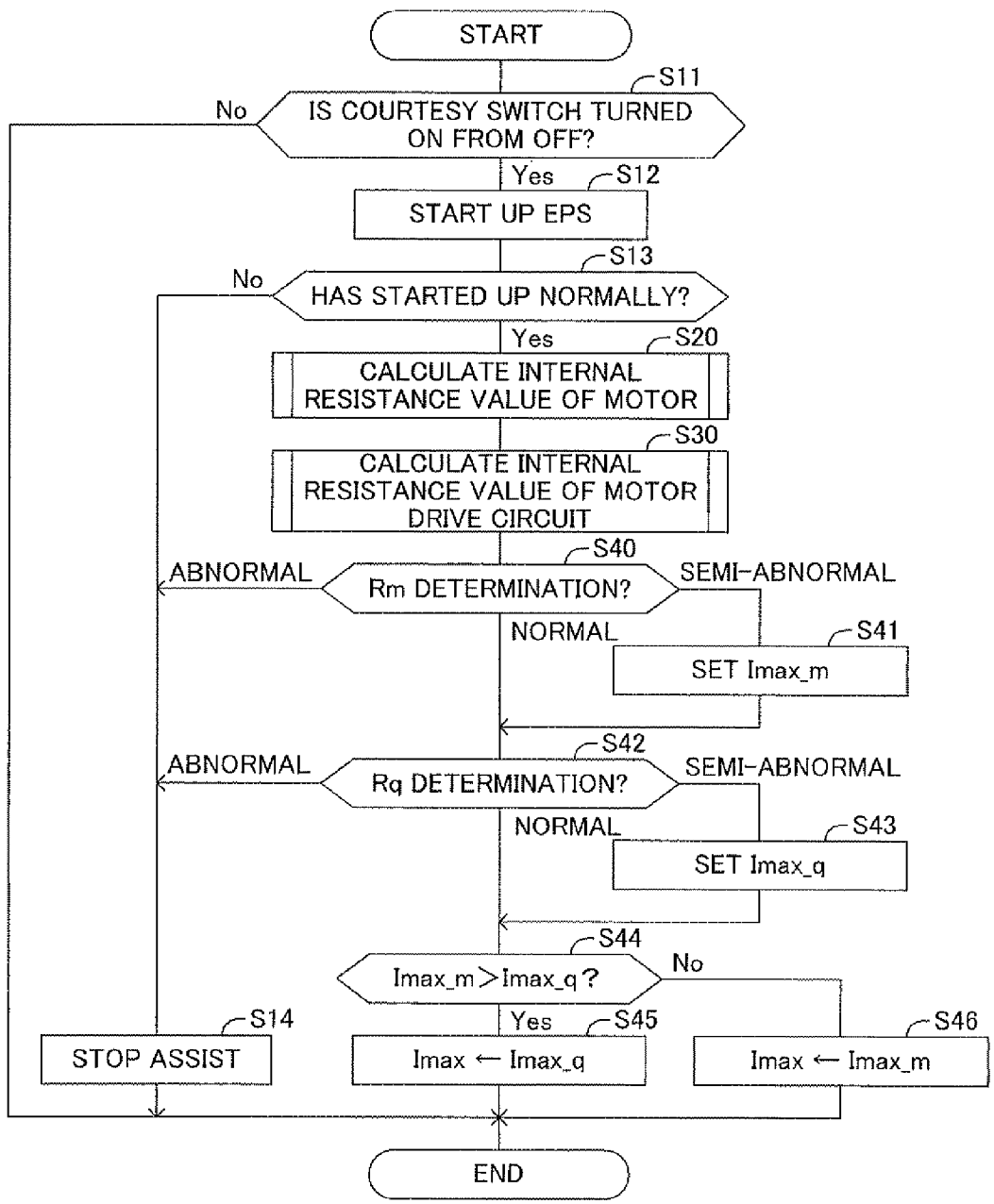
FIG. 6 A flowchart illustrating a motor limit value setting routine.

Description is given next of processing of limiting the operation of the motor 20 based on the measured internal resistance values. FIG. 6 illustrates a motor limit value setting routine executed by the microcomputer 60. The motor limit value setting routine is executed repeatedly at predetermined cycles.

Upon the start of this routine, in Step S11, the microcomputer 60 first reads the detection signal S of the courtesy switch 92, and determines whether or not the detection signal S has changed from the OFF state to the ON state. In other words, the microcomputer 60 determines whether or not the vehicle door has been opened (closed→open). When the detection signal S has not changed from the OFF state to the ON state, the microcomputer 60 finishes this routine once.

In the embodiment of the present invention, when the vehicle is not activated, a current is caused to flow through the motor 20 without being noticed by a driver, and the internal resistance values of the motor 20 and the motor drive circuit 40 are measured. Therefore, Step S11 is a step of detecting a timing when the driver opens the door to ride on the vehicle or a timing when the driver gets out of the vehicle. Note that, in Step S11, "No" is determined when the system of the electric power steering device 1 has already started up and the steering assist control is in operation. In this example, "Yes" is determined both when the driver opens the door to ride on the vehicle and when the driver opens the door to get out of the vehicle, but only one of the timings may be detected.

The microcomputer 60 repeats the determination of Step S11. When detecting that the detection signal S of the courtesy switch 92 has changed from the OFF state to the ON state, in Step S12, the microcomputer 60 subsequently starts up the system of the electric power steering device 1. Subsequently, in Step S13, the microcomputer 60 determines whether or not the system has started up normally. When the system has failed to start up normally, in Step S14, the microcomputer 60 stops the steering assist and finishes this routine.

Figure 7:
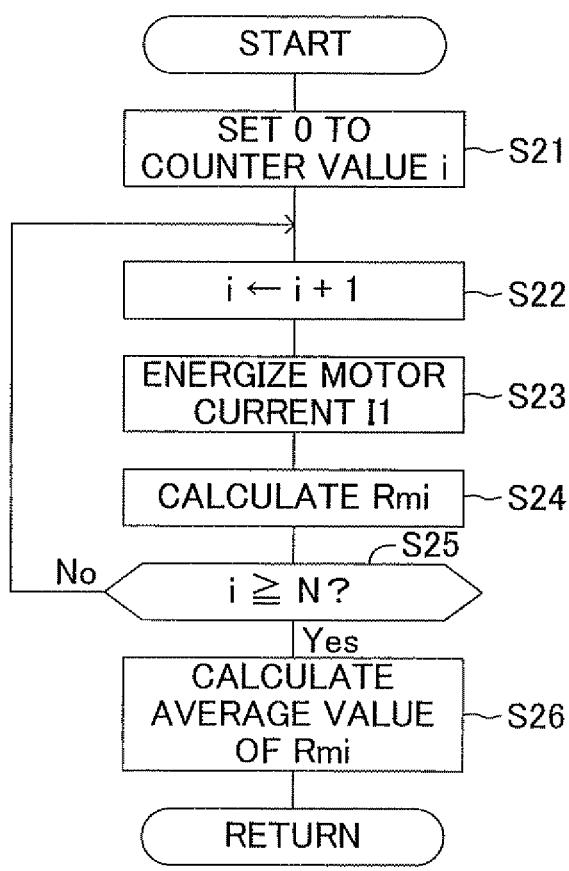
FIG. 7 A flowchart illustrating a motor internal resistance value calculating routine (subroutine).

When the system of the electric power steering device 1 has started up normally, in Step S20, the microcomputer 60 executes processing of calculating the internal resistance value of the motor 20. FIG. 7 is a flowchart illustrating the calculating processing, namely a motor internal resistance value calculating routine (subroutine).

Upon the start of the motor internal resistance value calculating routine, in Step S21, the microcomputer 60 clears a counter value i to zero. Subsequently, in Step S22, the microcomputer 60 increments the counter value i by 1. Subsequently, in Step S23, the current I1 is caused to flow through the motor 20. In this case, the current I1 is caused to flow through the motor 20 by controlling the duty cycles of the switching elements Q1 and Q4 in a state where the switching elements Q2 and Q3 are kept being turned OFF. Subsequently, in Step S24, the microcomputer 60 measures the motor terminal voltage V1, the second motor terminal voltage V2, and the motor current I (motor actual current Im) in this energization state, and calculates a motor internal resistance value Rmi by using Expression (4). The calculated motor internal resistance value Rmi is temporarily stored in a memory such as a RAM.

Subsequently, in Step S25, the microcomputer 60 determines whether or not the counter value i is equal to or larger than a predetermined value N (for example, N=10). When the counter value i is smaller than the predetermined value N, the processing returns to Step S22 to perform the same processing. When the microcomputer 60 repeats the energization of the motor 20 and the calculation of the motor internal resistance value Rmi N times (S25: Yes), in Step S26, the microcomputer 60 calculates an average value of the motor internal resistance values Rmi calculated N times. The microcomputer 60 sets the average value of the motor internal resistance values Rmi as the motor internal resistance value Rm, which is a final calculation result. After calculating the motor internal resistance value Rm, the microcomputer 60 finishes the motor internal resistance value calculating routine, and starts the processing from Step S30 of the main routine of FIG. 6.

The motor internal resistance value fluctuates depending on a contact position between a brush and a commutator segment. In order to deal with this problem, in the internal resistance value calculating routine, a moving average of the motor internal resistance values Rmi is used to calculate the final motor internal resistance value Rm. In this manner, the calculated motor internal resistance value Rm is not affected by the influence of the contact position between the brush and the commutator segment.

Figure 8:
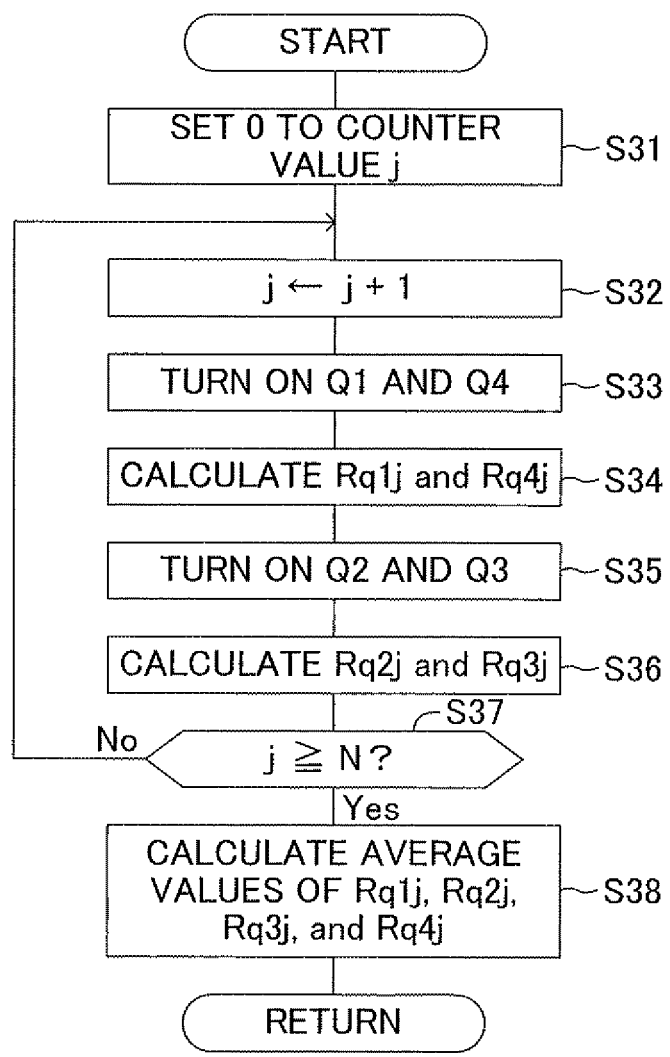
FIG. 8 A flowchart illustrating a drive circuit internal resistance value calculating routine (subroutine).

After calculating the motor internal resistance value Rm, in Step S30 of the main routine (FIG. 6), the microcomputer 60 subsequently executes processing of calculating the internal resistance value of the motor drive circuit 40. FIG. 8 is a flowchart illustrating the calculating processing, namely a drive circuit internal resistance value calculating routine (subroutine).

Upon the start of the drive circuit internal resistance value calculating routine, in Step S31, the microcomputer 60 clears a counter value j to zero. Subsequently, in Step S32, the microcomputer 60 increments the counter value j by 1. Subsequently, in Step S33, the microcomputer 60 turns ON the switching elements Q1 and Q4 for a given period of time (for example, several milliseconds) in a state where the switching elements Q2 and Q3 are kept being turned OFF. Then, in Step S34, the microcomputer 60 measures the first motor terminal voltage V1, the second motor terminal voltage V2, the power supply voltage Vcc, and the motor current I (motor actual current Im) in this energization state, and calculates internal resistance values $Rq1j$ and $Rq4j$ of the switching elements Q1 and Q4 by using Expressions (7) and (10). The calculated internal resistance values $Rq1j$ and $Rq4j$ are temporarily stored in a memory such as a RAM.

Subsequently, in Step S35, the microcomputer 60 turns ON the switching elements Q2 and Q3 for a given period of time (for example, several milliseconds) in a state where the switching elements Q1 and Q4 are kept being turned OFF. Then, in Step S36, the microcomputer 60 measures the first motor terminal voltage V1, the second motor terminal voltage V2, and the power supply voltage Vcc in this energization state, and calculates internal resistance values $Rq2j$ and $Rq3j$ of the switching elements Q2 and Q3 by using Expressions (8) and (9). The calculated internal resistance values $Rq2j$ and $Rq3j$ are temporarily stored in a memory such as a RAM.

Subsequently, in Step S37, the microcomputer 60 determines whether or not the counter value j is equal to or larger than a predetermined value N (for example, N=10). When the counter value j is smaller than the predetermined value N, the processing returns to Step S32 to perform the same processing. In this manner, the switching elements Q1 and Q4 for forward rotation and the switching elements Q2 and Q3 for backward rotation are alternately turned ON at predetermined cycles. The cycles are set short enough not to rotate the steering wheel 11.

When the microcomputer 60 repeats the energization of the motor 20 and the calculation of the internal resistance values $Rq1j$, $Rq2j$, $Rq3j$, and $Rq4j$ N times (S37: Yes), in Step S38, the microcomputer 60 calculates an average value of each of the internal resistance values $Rq1j$, $Rq2j$, $Rq3j$, and $Rq4j$ calculated N times. The microcomputer 60 sets the average values of the internal resistance values $Rq1j$, $Rq2j$, $Rq3j$, and $Rq4j$ as the internal resistance values Rq1, Rq2, Rq3, and Rq4, respectively, which are final calculation results. After calculating the internal resistance values Rq1, Rq2, Rq3, and Rq4, the microcomputer 60 finishes the drive circuit internal resistance value calculating routine, and starts the processing from Step S40 of the main routine of FIG. 6.

In Step S40, the microcomputer 60 determines whether the internal resistance of the motor 20 is normal, abnormal, or semi-abnormal based on the motor internal resistance value Rm. For example, the microcomputer 60 stores a first threshold Rref_m1 and a second threshold Rref_m2 (>Rref_m1) in advance as thresholds for discriminating among a normal range, an abnormal range, and a semi-abnormal range of the motor internal resistance value Rm. The first threshold Rref_m1 indicates a maximum resistance value in the normal range, and the second threshold Rref_m2 indicates a minimum resistance value in the abnormal range. When the motor internal resistance value Rm is smaller than the first threshold Rref_m1, the microcomputer 60 determines that the internal resistance of the motor 20 is normal. When the motor internal resistance value Rm is larger than the second threshold Rref_m1, the microcomputer 60 determines that the internal resistance of the motor 20 is abnormal. When the motor internal resistance value Rm falls between the first threshold Rref_m1 and the second threshold Rref_m2 (Rref_m1≤Rm≤Rref_m2), the microcomputer 60 determines that the internal resistance of the motor 20 is semi-abnormal. Note that, a lower limit value may be set in the normal range so as to detect a short-circuit abnormality.

Figure 9:
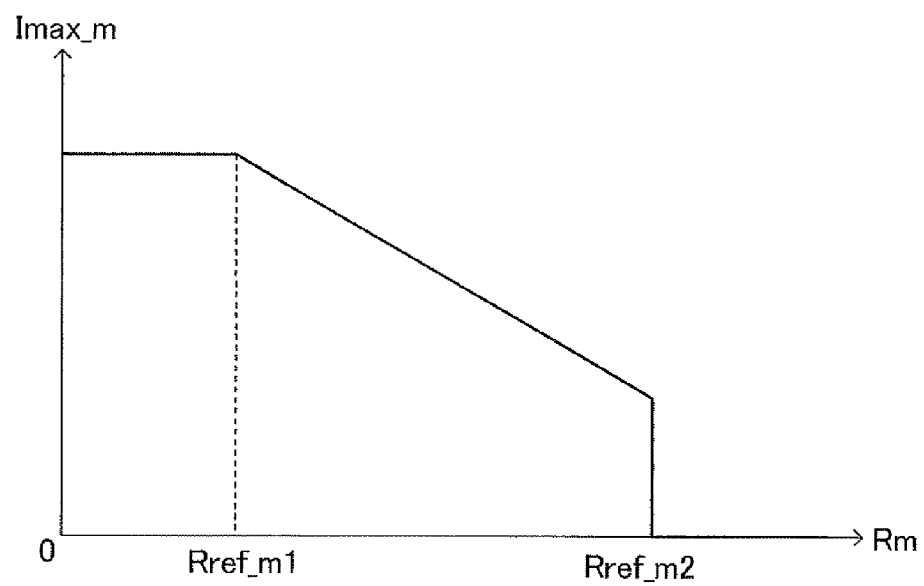
FIG. 9 A graph showing a motor resistance upper limit current map.

When determining in Step S40 that the motor 20 is abnormal, the microcomputer 60 proceeds the processing to Step S14 to stop the steering assist, and finishes this routine. When determining that the motor 20 is semi-abnormal, on the other hand, the microcomputer 60 sets an upper limit current Imax_m for motor resistance in Step S41. For example, the microcomputer 60 stores a motor resistance upper limit current map shown in FIG. 9. The microcomputer 60 refers to this map to set the upper limit current Imax_m for motor resistance. The motor resistance upper limit current map has such characteristics that the upper limit current Imax_m for motor resistance decreases as the motor internal resistance value Rm becomes larger.

When determining in Step S40 that the motor 20 is normal or when determining in Step S40 that the motor 20 is semi-abnormal and setting the upper limit current Imax_m for motor resistance, in Step S42, the microcomputer 60 subsequently determines whether the internal resistance of the motor drive circuit 40 is normal, abnormal, or semi-abnormal based on the internal resistance values Rq1, Rq2, Rq3, and Rq4 of the switching elements Q1, Q2, Q3, and Q4.

For example, the microcomputer 60 extracts a largest internal resistance value Rq among the internal resistance values Rq1, Rq2, Rq3, and Rq4, and uses the internal resistance value Rq to determine whether the internal resistance of the motor drive circuit 40 is normal, abnormal, or semi-abnormal. The maximum value of the internal resistance values Rq1, Rq2, Rq3, and Rq4 is hereinafter referred to as "circuit internal resistance value Rq".

The microcomputer stores a first threshold Rref_q1 and a second threshold Rref_q2 (>Rref_q1) in advance as thresholds for discriminating among a normal range, an abnormal range, and a semi-abnormal range of the circuit internal resistance value Rq. The first threshold Rref_q1 indicates a maximum resistance value in the normal range, and the second threshold Rref_q2 indicates a minimum resistance value in the abnormal range. When the circuit internal resistance value Rq is smaller than the first threshold Rref_q1, the microcomputer 60 determines that the internal resistance of the motor drive circuit 40 is normal. When the circuit internal resistance value Rq is larger than the second threshold Rref_q1, the microcomputer 60 determines that the internal resistance of the motor drive circuit 40 is abnormal. When the circuit internal resistance value Rq falls between the first threshold Rref_q1 and the second threshold Rref_q2 (Rref_q1≤Rq≤Rref_q2), the microcomputer 60 determines that the internal resistance of the motor drive circuit 40 is semi-abnormal. Note that, a lower limit value may be set in the normal range so as to detect a short-circuit abnormality.

Figure 10:
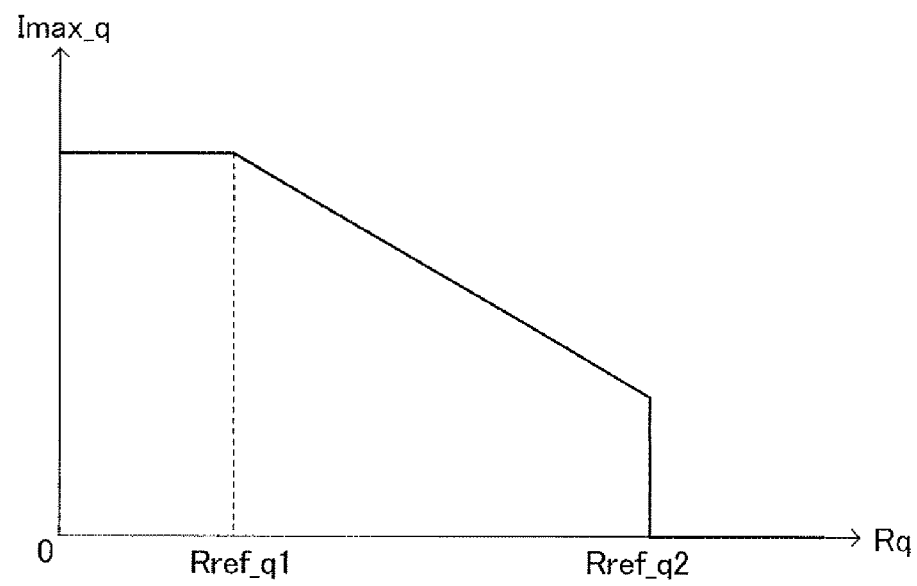
FIG. 10 A graph showing a circuit resistance upper limit current map.

When determining in Step S42 that the motor drive circuit 40 is abnormal, the microcomputer 60 proceeds the processing to Step S14 to stop the steering assist, and finishes this routine. When determining that the motor drive circuit 40 is semi-abnormal, on the other hand, the microcomputer 60 sets an upper limit current Imax_q for circuit resistance in Step S43. For example, the microcomputer 60 stores a circuit resistance upper limit current map shown in FIG. 10. The microcomputer 60 refers to this map to set the upper limit current Imax_q for circuit resistance. The circuit resistance upper limit current map has such characteristics that the upper limit current Imax_q for circuit resistance decreases as the circuit internal resistance value Rq becomes larger.

The motor resistance upper limit current map and the circuit resistance upper limit current map are set individually. Therefore, it is possible to separately set an upper limit current value (upper limit current Imax_m for motor resistance) suitable for the semi-abnormal state of the motor 20 and an upper limit current value (upper limit current Imax_q for circuit resistance) suitable for the semi-abnormal state of the motor drive circuit 40.

When determining in Step S42 that the motor drive circuit 40 is normal or when determining in Step S42 that the motor drive circuit 40 is semi-abnormal and setting the upper limit current Imax_q for circuit resistance, in Step S44, the microcomputer 60 subsequently determines whether or not the upper limit current Imax_m for motor resistance is larger than the upper limit current Imax_q for circuit resistance.

When the upper limit current Imax_m for motor resistance is larger than the upper limit current Imax_q for circuit resistance (S44: Yes), in Step S45, the microcomputer 60 sets the upper limit current Imax_q for circuit resistance as the upper limit current Imax to be used in the above-mentioned steering assist control routine (Imax←Imax_q). On the other hand, when the upper limit current Imax_m for motor resistance is equal to or smaller than the upper limit current Imax_q for circuit resistance (S44: No), in Step S46, the microcomputer 60 sets the upper limit current Imax_m for motor resistance as the upper limit current Imax (Imax←Imax_m). In this manner, a smaller one of the upper limit current Imax_m for motor resistance and the upper limit current Imax_q for circuit resistance is set as the upper limit current Imax. Note that, when the determination results in Steps S40 and S42 are both normal, the upper limit current Imax is set to be a value for the normal case. The upper limit current Imax for the normal case may be a preset fixed value, or a variable value that is set in accordance with a motor estimated temperature Tm and the substrate temperature Tb as described in a modified example later.

After setting the upper limit current Imax, the microcomputer 60 finishes the motor limit value setting routine once.

The electric power steering device 1 according to the embodiment of the present invention described above has the following functions and effects.

1. The internal resistance values of the motor 20 and the motor drive circuit 40 are measured, and hence the semi-abnormal states thereof can be reliably detected. For example, if the internal resistance of the motor energization path increases due to the increase in internal resistance of the switching elements Q1, Q2, Q3, and Q4, the deterioration of soldered parts, the increase in contact resistance of the brush of the motor 20, or other such causes, the amount of heat generation may increase to damage the motor energization path. In the embodiment of the present invention, however, the semi-abnormal state before the damage occurs can be detected.

2. In the case where the semi-abnormal state is detected, the upper limit current Imax of the motor 20 is set to be lower than in the normal case, and hence the heat generation of the motor 20 and the motor drive circuit 40 can be suppressed. In this manner, the progress of degradation of the motor 20 and the motor drive circuit 40 can be suppressed. The upper limit current Imax of the motor 20 is set to be smaller as the internal resistance value of the motor 20 or the motor drive circuit 40 becomes larger, and hence an appropriate upper limit current Imax corresponding to the degree of semi-abnormality can be set. In this manner, the lifetime of the electric power steering device 1 can be appropriately prolonged.

3. Even if a failure has occurred in the motor 20 or the motor drive circuit 40, the operation of the motor 20 has already been limited before the occurrence of the failure based on the increase in internal resistance value, and hence the steering assist is prevented from being stopped suddenly to cause an abrupt change in steering force. Therefore, the load on the driver can be reduced.

4. The internal resistance values of the motor 20 and the motor drive circuit 40 are measured at the timing when the courtesy switch 92 is turned ON, and hence the driver is prevented from being aware of the measurement.

5. The internal resistances of the motor 20 and the motor drive circuit 40 show a gradual change, but the resistance values are measured at every arrival of a preset timing, and hence the progress of the increase in internal resistance can be reliably detected.

6. In measuring the internal resistance value of the motor drive circuit 40, the energization in the forward rotation direction and the energization in the reverse rotation direction are alternately performed, and hence the steering wheel 11 is prevented from being rotated. In measuring the internal resistance value of the motor 20, on the other hand, a small current is caused to flow through the motor 20, and hence the steering wheel 11 is prevented from being rotated.

7. The internal resistance value is measured with the use of a moving average value through a plurality of measurements, and hence the calculated value is not affected by the influence of the contact position between the brush and the commutator segment, and the accuracy is therefore improved.

8. The upper limit current Imax_m for motor resistance, which is set based on the internal resistance value Rm of the motor 20, and the upper limit current Imax_q for circuit resistance, which is set based on the internal resistance value Rq of the motor drive circuit 40, are both calculated, and a smaller one of the calculated upper limit currents is set as the upper limit current Imax, and hence both the motor 20 and the motor drive circuit 40 can be properly protected.

Next, modified examples of the embodiment of the present invention are described.

Modified Example 1

Timing of Measuring Internal Resistance Value

In the above-mentioned embodiment, the detection signal S of the courtesy switch 92 is used to start measuring the internal resistance value (see S11). However, the timing of measuring the internal resistance value can be set in various ways. For example, instead of the courtesy switch 92, a detection signal S of a seating sensor 93 (illustrated by the broken line of FIG. 1) may be used to set the timing of measuring the internal resistance value. The seating sensor 93 outputs the detection signal S indicating a seating state of a driver on a driver's seat. Therefore, the internal resistance value may be measured at a timing when the seating sensor 93 detects that the driver was seated on the drivers seat or at a timing when the seating sensor 93 detects that the driver got out of the drivers seat.

Alternatively, the internal resistance value may be measured during the night. In this case, for example, a clock function provided in the microcomputer 60 is used to measure the internal resistance value at a preset given time during the night.

Alternatively, the internal resistance value may be measured at preset given time intervals.

Modified Example 2

Limitation on Operation of Motor

In the above-mentioned embodiment, when the semi-abnormal state of the motor 20 or the motor drive circuit 40 is detected, the upper limit current Imax corresponding to the internal resistance value Rm or Rq is set to limit the operation of the motor 20. However, various methods can also be employed to limit the operation of the motor 20.

Modified Example 2-1

Current Limitation Depending on Elapsed Time

Figure 11:
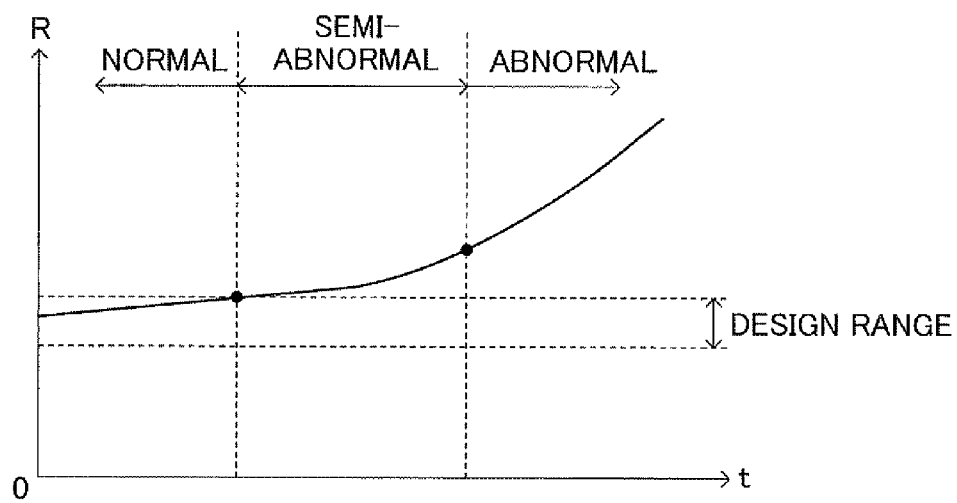
FIG. 11 A graph showing a transition of the internal resistance value.
Figure 12:
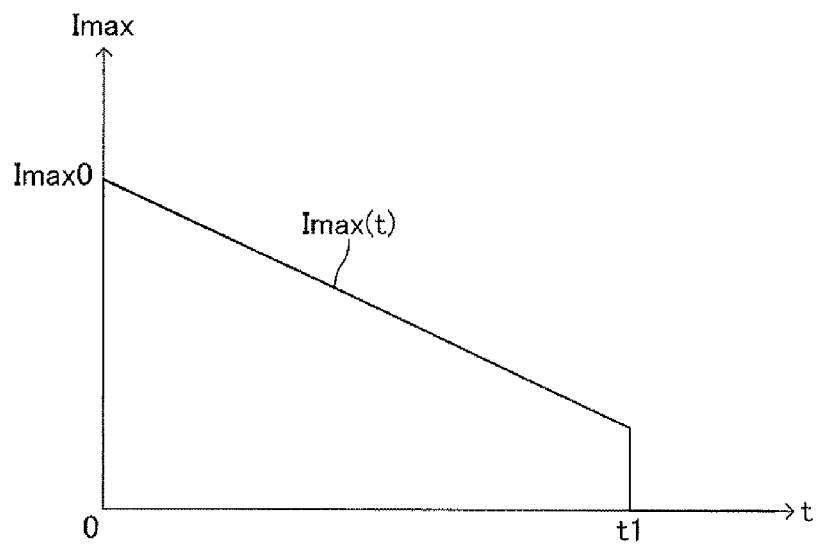
FIG. 12 A graph showing an upper limit current map according to Modified Example 2-1.

For example, the upper limit current Imax may be decreased gradually with time. As shown in FIG. 11, an internal resistance value R of the motor 20 or the motor drive circuit 40 increases gradually with time t. In view of this, according to this modified example, as shown in FIG. 12, an elapsed time t is measured from the first detection of the semi-abnormal state, and the upper limit current Imax is decreased gradually from an initial value Imax0 with the elapsed time t, the initial value Imax0 corresponding to an upper limit current Imax0 measured in the normal case. In this case, the elapsed time t is set as an accumulated value of time during which the system of the electric power steering device 1 is in operation, that is, an accumulated value of time during which the steering assist control is performed. In this example, when the elapsed time t reaches a stop setting time t1, the steering assist is stopped. Therefore, the stop setting time t1 is a steering assist executable period starting from the detection of the semi-abnormal state.

Figure 13:
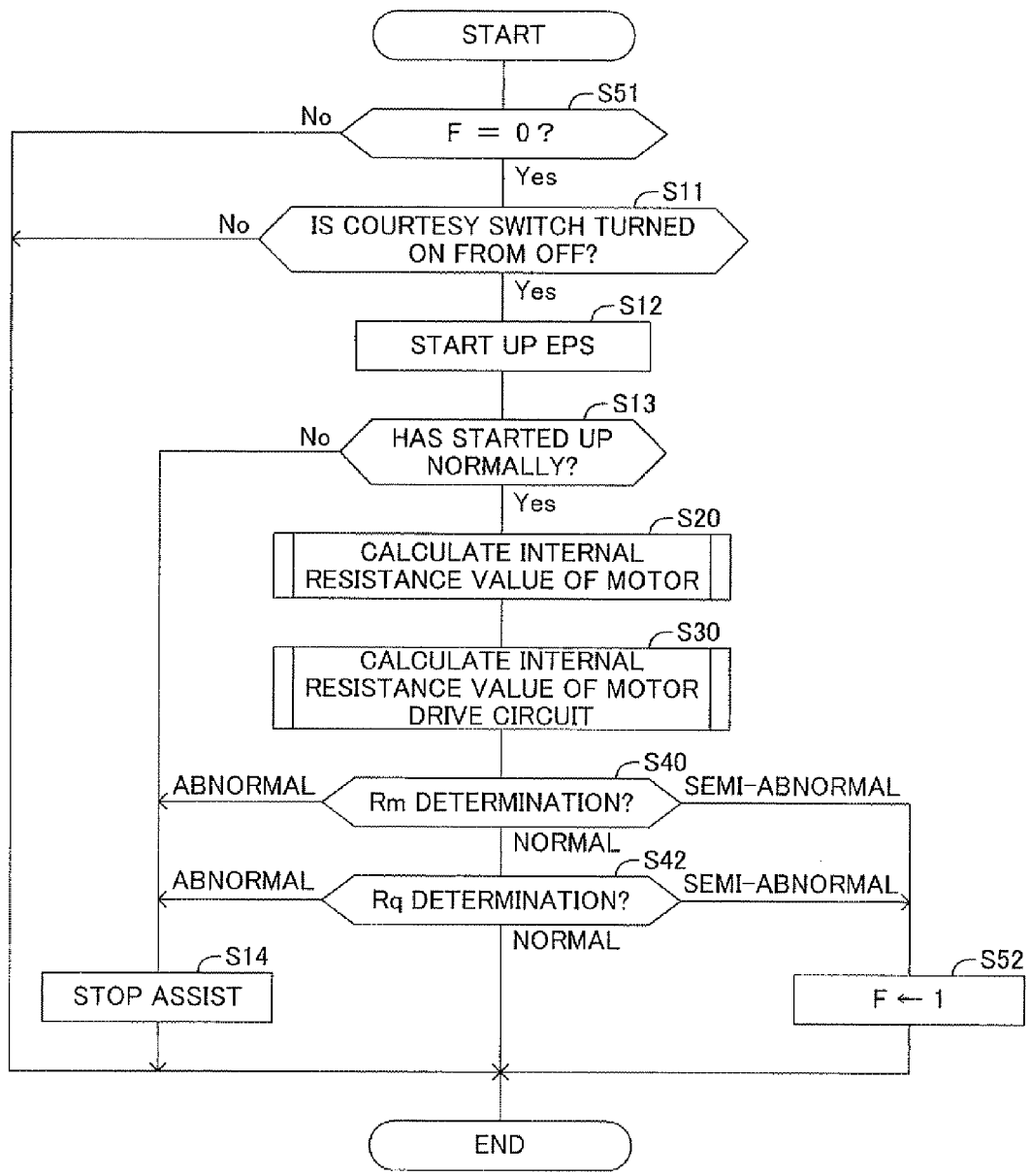
FIG. 13 A flowchart illustrating an internal resistance value determining routine according to Modified Example 2-1.
Figure 14:
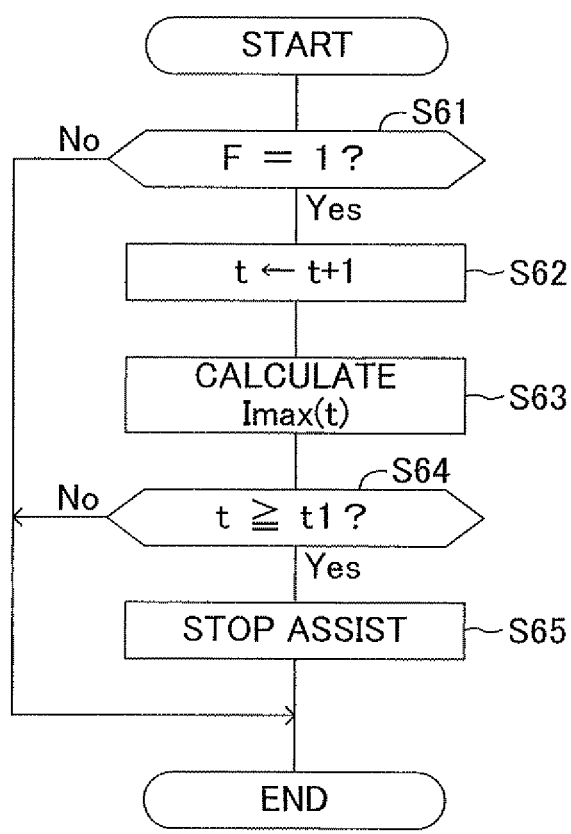
FIG. 14 A flowchart illustrating a motor limit value setting routine according to Modified Example 2-1.

FIGS. 13 and 14 illustrate processing of the microcomputer 60 according to Modified Example 2-1. This processing is alternative to the motor limit value setting routine (FIG. 6) according to the embodiment. FIG. 13 illustrates an internal resistance value determining routine, and FIG. 14 illustrates a motor limit value setting routine. In the following, the same processing in FIGS. 13 and 14 as in the motor limit value setting routine (FIG. 6) according to the embodiment is denoted by the same step number as in the embodiment, and description thereof is omitted. The internal resistance value determining routine and the motor limit value setting routine are executed in parallel at predetermined cycles.

Upon the start of the internal resistance value determining routine (FIG. 13), in Step S51, the microcomputer 60 first determines whether or not a semi-abnormality determination flag F is "0". The semi-abnormality determination flag F of "1" indicates that the semi-abnormal state of the motor 20 or the motor drive circuit 40 has been detected, and the semi-abnormality determination flag F of "0" indicates that the semi-abnormal state has not been detected. The initial value of the semi-abnormality determination flag F is set to "0". When the semi-abnormality determination flag F is "0" (F=0), the microcomputer 60 performs the processing from Step S11.

When detecting the semi-abnormal state of the motor 20 in Step S40, or when detecting the semi-abnormal state of the motor drive circuit 40 in Step S42, the microcomputer 60 sets the semi-abnormality determination flag F to "1" in Step S52 to finish the internal resistance value determining routine once.

On the other hand, when determining in Steps S40 and S42 that the motor 20 and the motor drive circuit 40 are normal, the microcomputer 60 finishes the internal resistance value determining routine once without any further processing. In this case, the upper limit current Imax is set to a value used for the normal case.

The internal resistance value determining routine is repeated at predetermined cycles. Once the semi-abnormality determination flag F is set to "1", the determination of Step S51 becomes "No". In this case, the internal resistance values of the motor 20 and the motor drive circuit 40 are no longer detected, and instead, the upper limit current Imax is calculated in the motor limit value setting routine illustrated in FIG. 14.

In Step S61 of the motor limit value setting routine (FIG. 14), the microcomputer 60 determines whether or not the semi-abnormality determination flag F is set to "1". The microcomputer 60 repeats this determination until the semi-abnormality determination flag F is set to "1". In the period until the semi-abnormality determination flag F is set to "1", the abnormality determination (S40, S42) is performed based on the internal resistance values in the above-mentioned internal resistance value determining routine.

When the semi-abnormality determination flag F is set to "1" (S61: Yes), in Step S62, the microcomputer 60 increments a timer value t by 1. The timer value t indicates an elapsed time since the semi-abnormality determination flag F was set to "1", that is, an elapsed time since the semi-abnormal state of the motor 20 or the motor drive circuit 40 was detected. The initial value of the timer value t is set to zero.

Subsequently, in Step S63, the microcomputer 60 calculates an upper limit current Imax corresponding to the timer value t. The microcomputer stores an upper limit current map as shown in FIG. 12. The microcomputer refers to the upper limit current map to set the upper limit current Imax corresponding to the timer value t (elapsed time). The upper limit current map has such characteristics that the upper limit current Imax decreases gradually from the initial value Imax0 with time. The upper limit current Imax is a current limit value of the motor 20 to be used in Step S4 of the steering assist control routine. Subsequently, in Step S64, the microcomputer 60 determines whether or not the timer value t has reached the preset stop setting time t1. When the timer value t has not reached the stop setting time t1, the microcomputer 60 finishes the motor limit value setting routine once.

The microcomputer 60 repeats the processing described above at predetermined cycles. In this manner, the upper limit current Imax is set so as to be decreased gradually along with the increase in the elapsed time t. Therefore, the limitation on the operation of the motor 20 becomes higher (severer) with time. Then, when the elapsed time t has reached the stop setting time t1 (S64: Yes), in Step S65, the microcomputer 60 stops the steering assist and inhibits the further steering assist control. The microcomputer 60 finishes the internal resistance value determining routine and the motor limit value setting routine.

Note that, the upper limit current map is set in advance based on a possible change in the internal resistance value of the motor 20 or the motor drive circuit 40 (see FIG. 11). Therefore, the stop setting time t1 assumes a very long time. Accordingly, in order to store and hold the timer value t even when the ignition switch is turned OFF, the microcomputer 60 stores the timer value t in a non-volatile memory (not shown) each time the motor limit value setting routine is finished. The microcomputer 60 reads the timer value t stored in the non-volatile memory each time the motor limit value setting routine is restarted, and increments the timer value t to count an accumulated time.

According to Modified Example 2-1, in the case where the semi-abnormal state of the motor 20 or the motor drive circuit 40 is detected, the upper limit current Imax corresponding to a temporal change of the internal resistance value is set at the time of this detection, and hence the operation of the motor 20 can be appropriately limited.

Modified Example 2-2

Current Limitation Depending on Region where Semi-Abnormality has Occurred

The time (remaining lifetime) from the detection of the semi-abnormal state of the motor 20 until the motor 20 reaches the abnormal state and the time (remaining lifetime) from the detection of the semi-abnormal state of the motor drive circuit 40 until the motor drive circuit 40 reaches the abnormal state do not always match with each other. In view of this, in Modified Example 2-2, the upper limit current Imax is calculated with the use of an upper limit current map in which different stop setting times t1 are set for the case where the semi-abnormal state of the motor 20 is detected and the case where the semi-abnormal state of the motor drive circuit 40 is detected. In this manner, an appropriate steering assist executable period corresponding to the remaining lifetime of the semi-abnormal region can be set.

Figure 15:
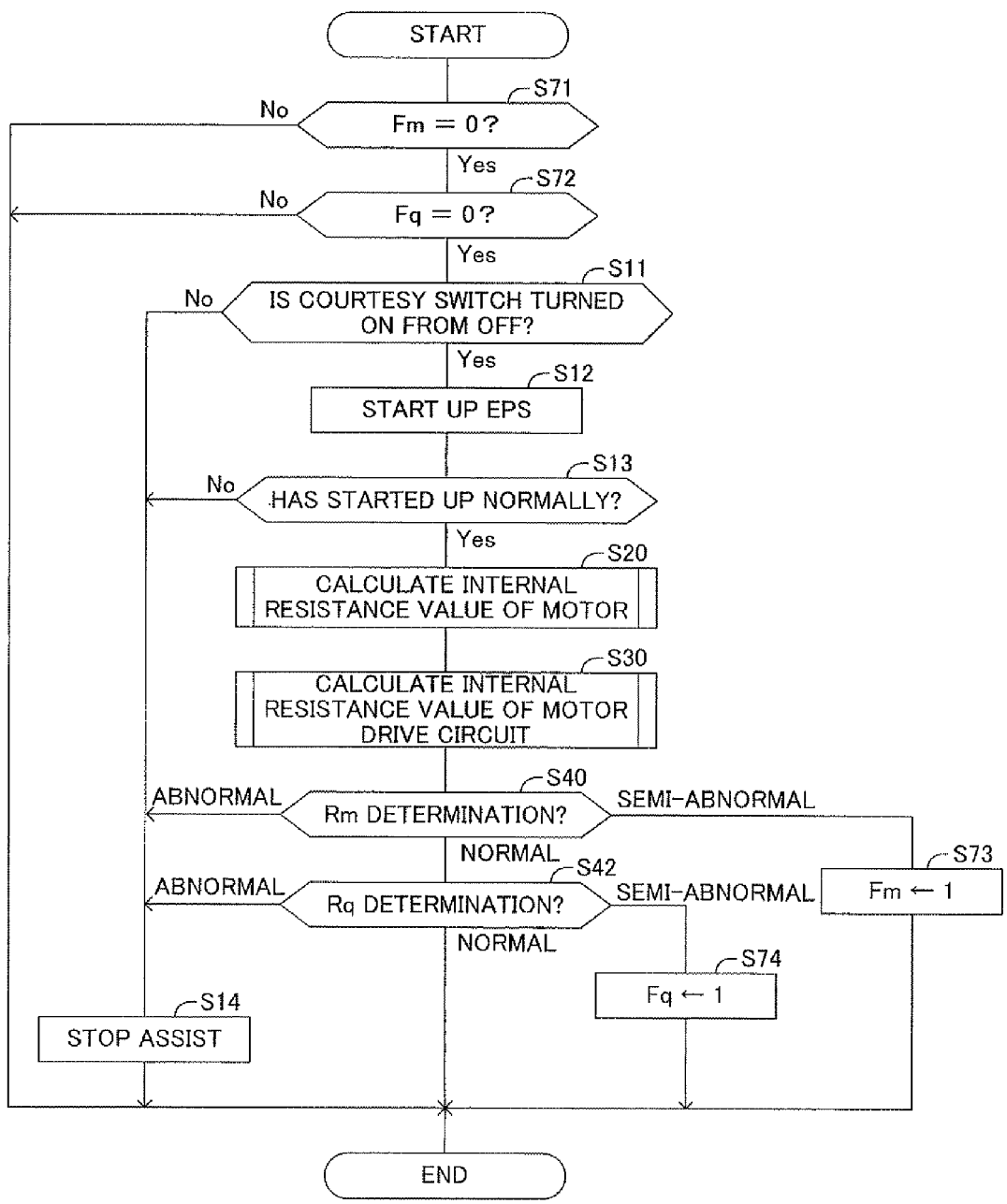
FIG. 15 A flowchart illustrating an internal resistance value determining routine according to Modified Example 2-2.
Figure 16:
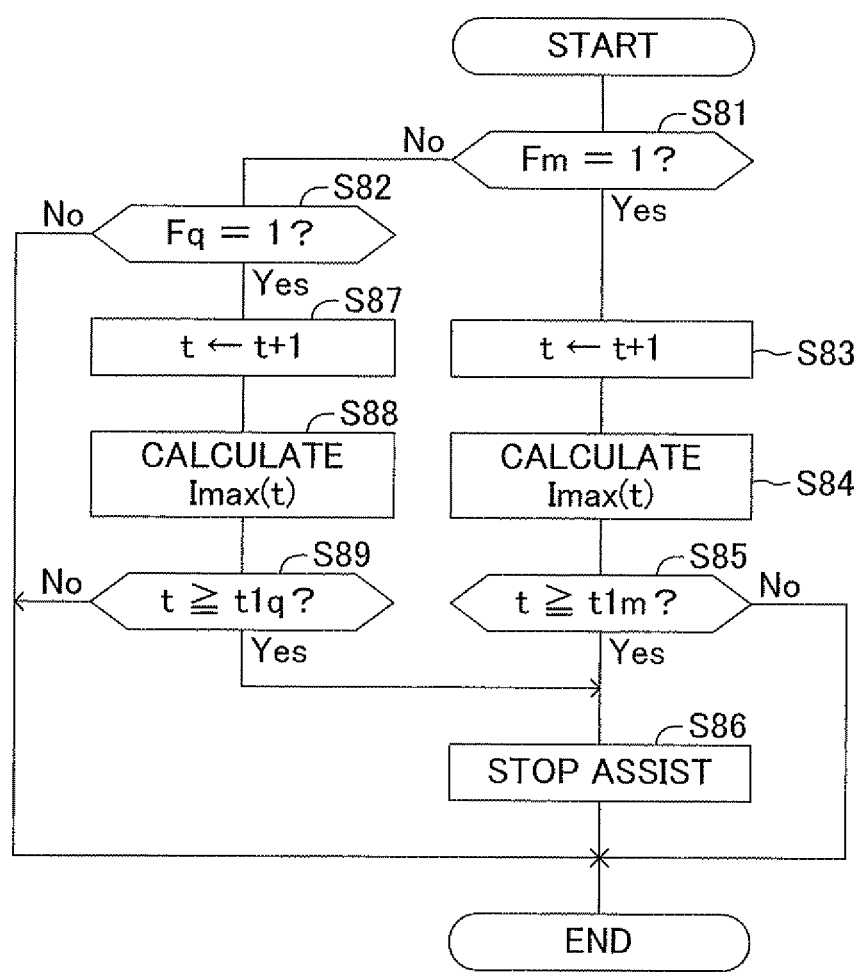
FIG. 16 A flowchart illustrating a motor limit value setting routine according to Modified Example 2-2.

FIGS. 15 and 16 illustrate processing of the microcomputer 60 according to Modified Example 2-2. This processing is alternative to the motor limit value setting routine (FIG. 6) according to the embodiment. FIG. 15 illustrates an internal resistance value determining routine, and FIG. 16 illustrates a motor limit value setting routine. In the following, the same processing in FIGS. 15 and 16 as in the motor limit value setting routine (FIG. 6) according to the embodiment is denoted by the same step number as in the embodiment, and description thereof is omitted. The internal resistance value determining routine and the motor limit value setting routine are executed in parallel at predetermined cycles.

Upon the start of the internal resistance value determining routine (FIG. 15), in Step S71, the microcomputer 60 first determines whether or not a motor semi-abnormality determination flag Fm is "0". The motor semi-abnormality determination flag Fm of "1" indicates that the semi-abnormal state of the motor 20 has been detected, and the motor semi-abnormality determination flag Fm of "0" indicates that the semi-abnormal state has not been detected. An initial value of the motor semi-abnormality determination flag Fm is set to "0". When the motor semi-abnormality determination flag Fm is "0" (Fm=0), the microcomputer 60 determines whether or not a circuit semi-abnormality determination flag Fq is "0" in Step S72. The circuit semi-abnormality determination flag Fq of "1" indicates that the semi-abnormal state of the motor drive circuit 40 has been detected, and the circuit semi-abnormality determination flag Fq of "0" indicates that the semi-abnormal state has not been detected. The initial value of the circuit semi-abnormality determination flag Fq is set to "0".

When the circuit semi-abnormality determination flag Fq is "0" (Fq=0), the microcomputer 60 performs the processing from Step S11.

When detecting the semi-abnormal state of the motor 20 in Step S40, the microcomputer 60 sets the motor semi-abnormality determination flag Fm to "1" in Step S73 to finish the internal resistance value determining routine once. On the other hand, when detecting the semi-abnormal state of the motor drive circuit 40 in Step S42, the microcomputer 60 sets the circuit semi-abnormality determination flag Fq to "1" in Step S74 to finish the internal resistance value determining routine once.

On the other hand, when determining in Steps S40 and S42 that the motor 20 and the motor drive circuit 40 are normal, the microcomputer 60 finishes the internal resistance value determining routine once without any further processing. In this case, the upper limit current Imax is set to a value used for the normal case.

The internal resistance value determining routine is repeated at predetermined cycles. Once the motor semi-abnormality determination flag Fm or the circuit semi-abnormality determination flag Fq is set to "1", the determination of Step S71 or Step S72 becomes "No". In this case, the internal resistance values of the motor 20 and the motor drive circuit 40 are no longer detected, and instead, the upper limit current Imax is calculated in the motor limit value setting routine illustrated in FIG. 16.

In Step S81 of the motor limit value setting routine (FIG. 16), the microcomputer 60 determines whether or not the motor semi-abnormality determination flag Fm is set to "1". When the motor semi-abnormality determination flag Fm is "0" (Fm=0), in Step S82, the microcomputer 60 determines whether or not the circuit semi-abnormality determination flag Fq is set to "1". The microcomputer 60 repeats those two determinations until the motor semi-abnormality determination flag Fm or the circuit semi-abnormality determination flag Fq is set to "1". In the period until the motor semi-abnormality determination flag Fm or the circuit semi-abnormality determination flag Fq is set to "1", the abnormality determination (S40, S42) is performed based on the internal resistance values in the above-mentioned internal resistance value determining routine.

The microcomputer 60 repeats the determination of the setting states of the semi-abnormality determination flags Fm and Fq. When the motor semi-abnormality determination flag Fm is set to "1" (S81: Yes), in Step S83, the microcomputer 60 increments a timer value t by 1. The timer value t indicates an elapsed time since the motor semi-abnormality determination flag Fm was set to "1", that is, an elapsed time since the semi-abnormal state of the motor 20 was detected. The initial value of the timer value t is set to zero.

Figure 17:
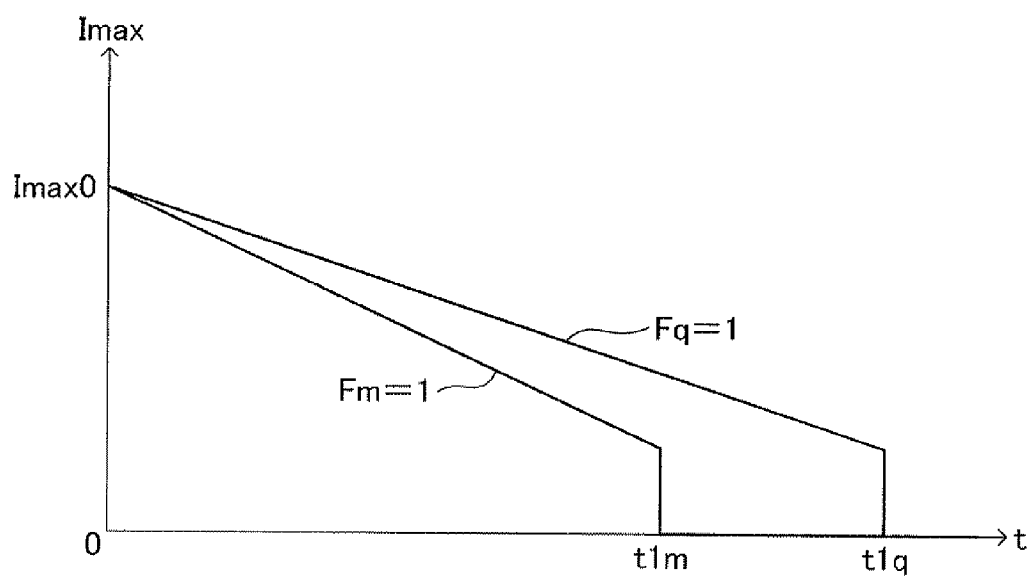
FIG. 17 A graph showing an upper limit current map according to Modified Example 2-2.

Subsequently, in Step S84, the microcomputer 60 calculates an upper limit current Imax corresponding to the timer value t. The microcomputer stores an upper limit current map as shown in FIG. 17. The microcomputer refers to the upper limit current map to set the upper limit current Imax corresponding to the timer value t (elapsed time). The upper limit current map has such characteristics that the upper limit current Imax decreases gradually from the initial value Imax0 with time. The characteristics of the upper limit current map are set to be different between the case where the motor semi-abnormality determination flag Fm is set to "1", that is, the case where the semi-abnormal state of the motor 20 is detected, and the case where the circuit semi-abnormality determination flag Fq is set to "1", that is, the case where the semi-abnormal state of the motor drive circuit 40 is detected.

For example, in the case where the remaining lifetime from the detection of the semi-abnormal state of the motor 20 is shorter than the remaining lifetime from the detection of the semi-abnormal state of the motor drive circuit 40, as shown in FIG. 17, a stop setting time t1$m$ for the case where the semi-abnormal state of the motor 20 is detected is set to be shorter than a stop setting time t1$q$ for the case where the semi-abnormal state of the motor drive circuit 40 is detected. Note that, in the case where the relationship of the remaining lifetime between the motor 20 and the motor drive circuit 40 is reverse, the characteristics of the upper limit current map are reversed so that the stop setting time t1$m$ is set to be longer than the stop setting time t1$q$.

After referring to the upper limit current map to set the upper limit current Imax in Step S84, the microcomputer 60 subsequently determines in Step S85 whether or not the timer value t has reached the preset stop setting time t1$m$. When the timer value t has not reached the stop setting time t1$m$, the microcomputer 60 finishes the motor limit value setting routine once.

The microcomputer 60 repeats the processing described above at predetermined cycles. In this manner, the upper limit current Imax is set so as to be decreased gradually along with the increase in the elapsed time t. Therefore, the limitation on the operation of the motor 20 becomes higher (severer) with time. Then, when the elapsed time t has reached the stop setting time t1$m$ (S85: Yes), in Step S86, the microcomputer 60 stops the steering assist and inhibits the further steering assist control. The microcomputer 60 finishes the internal resistance value determining routine and the motor limit value setting routine.

On the other hand, when the circuit semi-abnormality determination flag Fq is set to "1" (S82: Yes), in Step S87, the microcomputer 60 increments a timer value t by 1. The timer value t indicates an elapsed time since the circuit semi-abnormality determination flag Fq was set to "1", that is, an elapsed time since the semi-abnormal state of the motor drive circuit 40 was detected. The initial value of the timer value t is set to zero.

Subsequently, in Step S88, the microcomputer 60 refers to the upper limit current map (FIG. 17) to calculate an upper limit current Imax corresponding to the timer value t. Subsequently, in Step S89, the microcomputer 60 determines whether or not the timer value t has reached the preset stop setting time t1$q$. When the timer value t has not reached the stop setting time t1$q$, the microcomputer 60 finishes the motor limit value setting routine once.

The microcomputer 60 repeats the processing described above at predetermined cycles. In this manner, the upper limit current Imax is set so as to be decreased gradually along with the increase in the elapsed time t. Therefore, the limitation on the operation of the motor 20 becomes higher (severer) with time. Then, when the elapsed time t has reached the stop setting time t1$q$ (S89: Yes), in Step S86, the microcomputer 60 stops the steering assist and inhibits the further steering assist control. The microcomputer 60 finishes the internal resistance value determining routine and the motor limit value setting routine.

According to Modified Example 2-2, the characteristics of the upper limit current Imax and the stop setting times t1 are set independently for the case where the motor 20 becomes the semi-abnormal state and the case where the motor drive circuit 40 becomes the semi-abnormal state. In other words, the characteristics of the upper limit current Imax and the stop setting time t1 are switched depending on the region where the semi-abnormality has occurred. In this manner, an appropriate steering assist corresponding to the degree of degradation of the semi-abnormal region can be executed. Further, an appropriate steering assist executable period corresponding to the remaining lifetime of the semi-abnormal region can be set. As a result, the operation of the motor 20 can be limited more appropriately.

Modified Example 2-3

Limitation on Operation Based on Maximum Voltage

Figure 19:
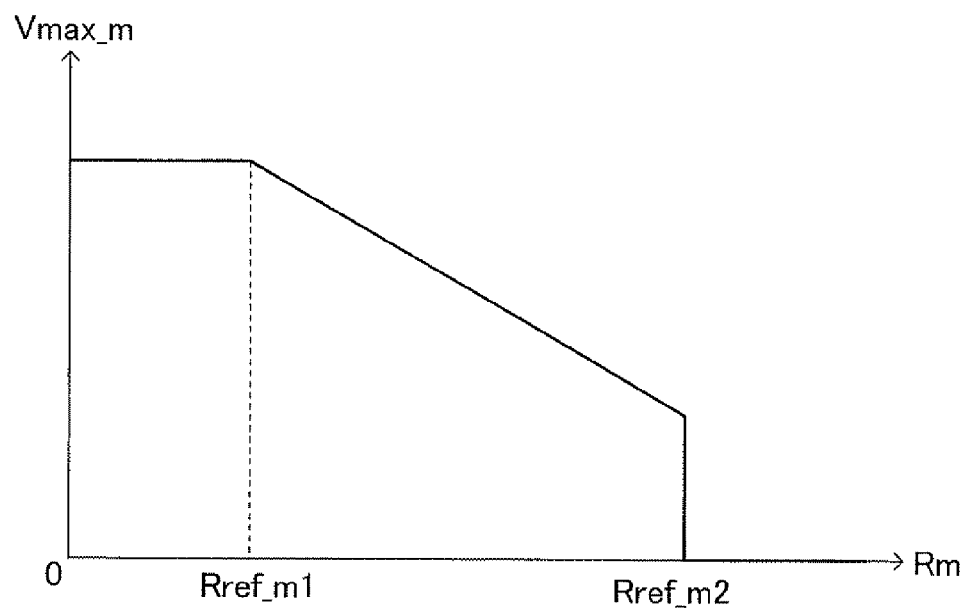
FIG. 19 A graph showing a motor resistance upper limit command voltage map according to Modified Example 2-3.
Figure 20:
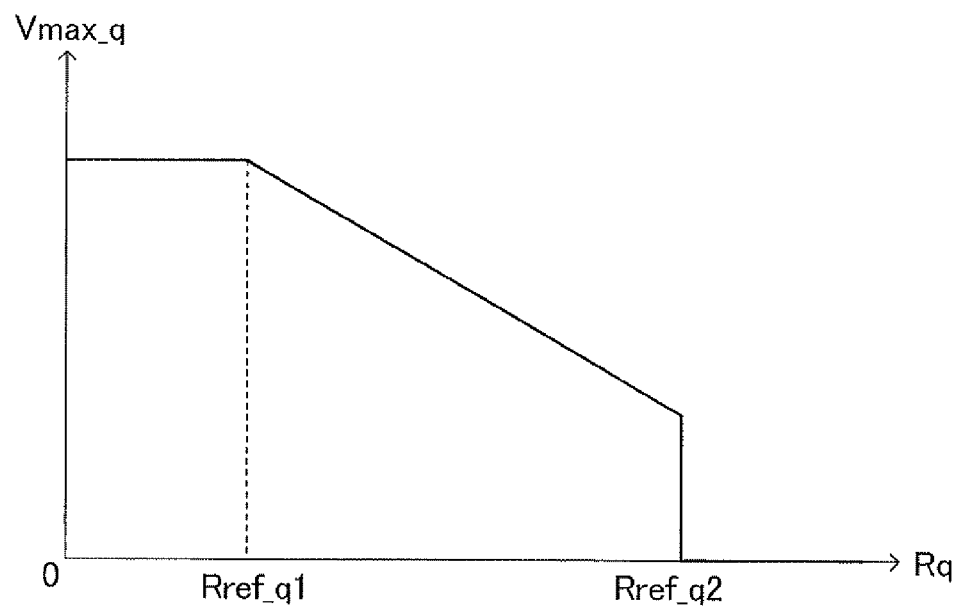
FIG. 20 A graph showing a circuit resistance upper limit command voltage map according to Modified Example 2-3.

The operation of the motor 20 may be limited by limiting a maximum voltage to be applied to the motor 20. For example, an upper limit command voltage Vmax as an upper limit value of the target command voltage V* is set to a value corresponding to the internal resistance value. In this case, the microcomputer 60 stores a motor resistance upper limit command voltage map as shown in FIG. 19 and a circuit resistance upper limit command voltage map as shown in FIG. 20. The motor resistance upper limit command voltage map has such characteristics that an upper limit command voltage Vmax_m for motor resistance decreases as the internal resistance value Rm becomes larger. The circuit resistance upper limit command voltage map has such characteristics that an upper limit command voltage Vmax_q for circuit resistance decreases as the internal resistance value Rq becomes larger.

Figure 18:
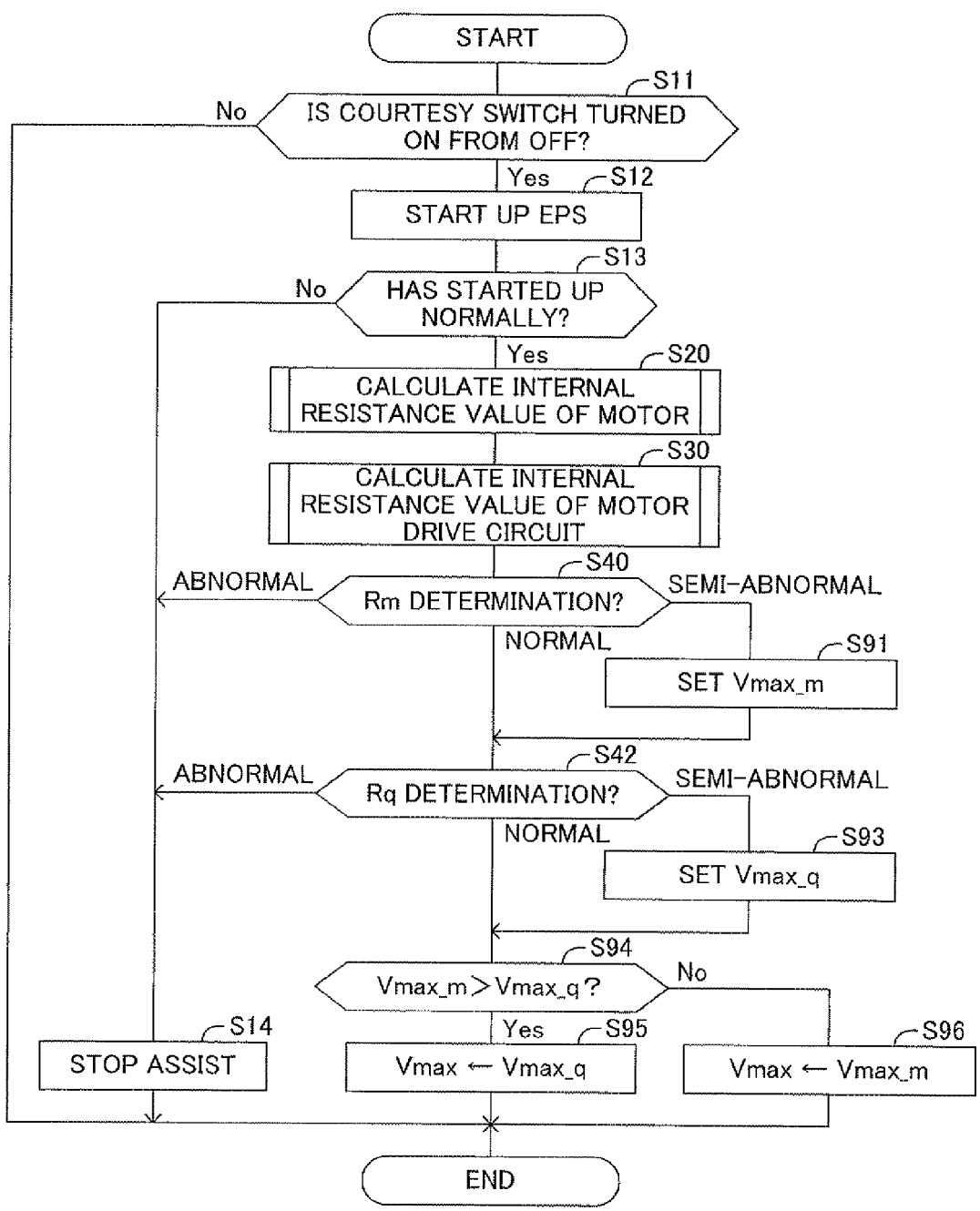
FIG. 18 A flowchart illustrating a motor limit value setting routine according to Modified Example 2-3.

The microcomputer 60 executes a motor limit value setting routine illustrated in FIG. 18. This motor limit value setting routine is obtained by partially changing the motor limit value setting routine (FIG. 6) according to the embodiment. In the following, the same processing in FIG. 18 as in the embodiment is denoted by the same step number as in the embodiment, and description thereof is omitted.

When determining in Step S40 that the motor 20 is semi-abnormal, in Step S91, the microcomputer 60 refers to the motor resistance upper limit command voltage map shown in FIG. 19 to set the upper limit command voltage Vmax_m for motor resistance. When determining in Step S42 that the motor drive circuit 40 is semi-abnormal, in Step S93, the microcomputer 60 refers to the circuit resistance upper limit command voltage map shown in FIG. 20 to set the upper limit command voltage Vmax_q for circuit resistance.

When the upper limit command voltage Vmax_m for motor resistance is larger than the upper limit command voltage Vmax_q for circuit resistance (S94: Yes), in Step S95, the microcomputer 60 sets the upper limit command voltage Vmax as the upper limit command voltage Vmax_q for circuit resistance. On the other hand, when the upper limit command voltage Vmax_m for motor resistance is equal to or smaller than the upper limit command voltage Vmax_q for circuit resistance (S94: No), in Step S96, the microcomputer 60 sets the upper limit command voltage Vmax as the upper limit command voltage Vmax_m for motor resistance. In this manner, the upper limit command voltage Vmax is set to a smaller one of the upper limit command voltage Vmax_m for motor resistance and the upper limit command voltage Vmax_q for circuit resistance.

Figure 21:
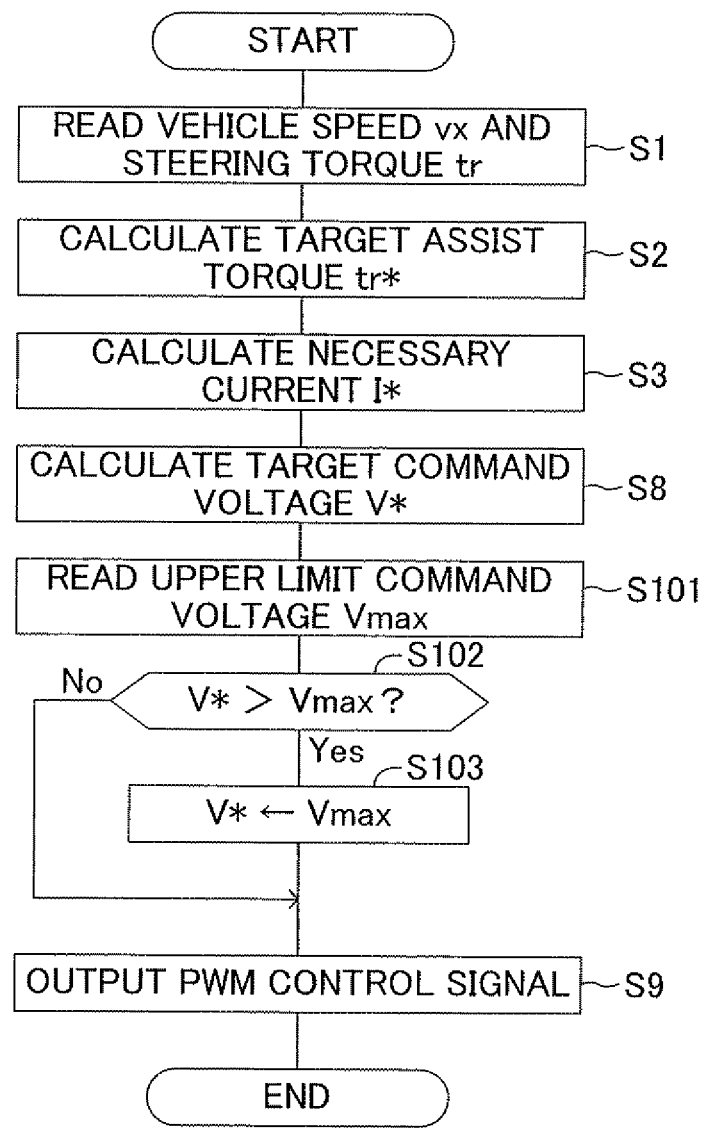
FIG. 21 A flowchart illustrating a steering assist control routine according to Modified Example 2-3.

The resultant upper limit command voltage Vmax is used in the steering assist control routine. FIG. 21 illustrates a modified example of the steering assist control routine. This steering assist control routine is obtained by partially changing the steering assist control routine (FIG. 3) according to the embodiment. In the following, the same processing in FIG. 21 as in the embodiment is denoted by the same step number as in the embodiment, and description thereof is omitted.

After calculating the necessary current I* in Step S3, in Step S8, the microcomputer 60 sets the necessary current I* as a target current Im*, calculates a deviation M by subtracting a motor actual current Im detected by the current sensor ΔI from the target current Im*, and performs proportional-integral control (PI control) using the deviation ΔI to calculate a target command voltage V* so that the motor actual current Im may follow the target current Im*.

Subsequently, in Step S101, the microcomputer reads the upper limit command voltage Vmax calculated in the above-mentioned motor limit value setting routine. Subsequently, in Step S102, the microcomputer determines whether or not the target command voltage V* is larger than the upper limit command voltage Vmax. When the target command voltage V* is larger than the upper limit command voltage Vmax, the microcomputer sets the target command voltage V* as the upper limit command voltage Vmax in Step S103. On the other hand, when the target command voltage V* is equal to or smaller than the upper limit command voltage Vmax, the microcomputer skips the processing of Step S103. In other words, the microcomputer does not change the target command voltage V*.

According to Modified Example 2-3, in the case where the motor 20 or the motor drive circuit 40 becomes the semi-abnormal state, the upper limit command voltage Vmax corresponding to the degree of semi-abnormality is set, and hence the same function and effects as in the embodiment can be obtained.

Modified Example 2-4

Voltage Limitation Depending on Elapsed Time

Figure 22:
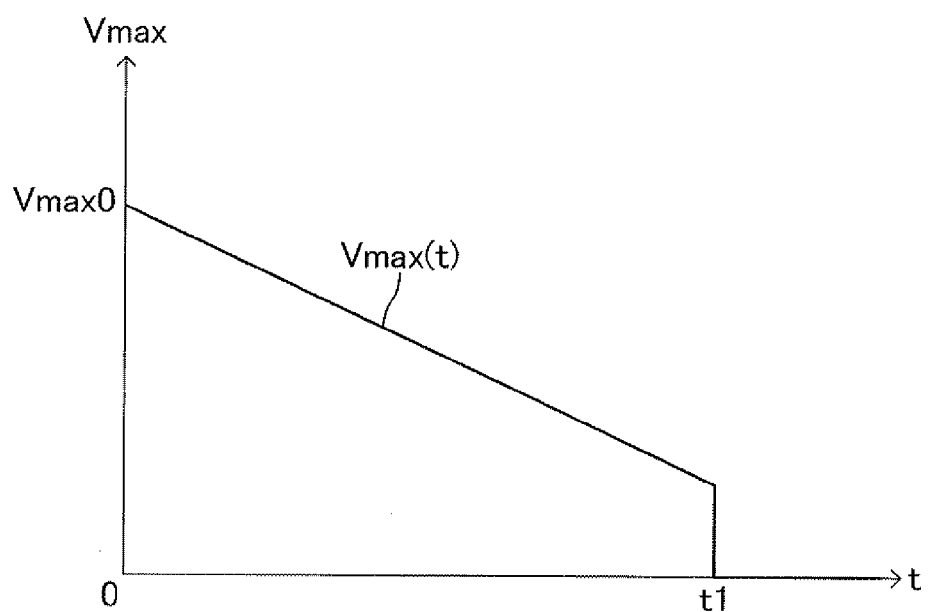
FIG. 22 A graph showing an upper limit command voltage map according to Modified Example 2-4.

In Modified Example 2-1, the upper limit current Imax is decreased gradually with time. In Modified Example 2-4, instead, the upper limit command voltage Vmax is decreased gradually with time as shown in FIG. 22. In this case, the microcomputer 60 executes the same processing as in the internal resistance value determining routine illustrated in FIG. 13, the motor limit value setting routine illustrated in FIG. 14, and the steering assist control routine illustrated in FIG. 21. Note that, the microcomputer 60 stores an upper limit command voltage map having the characteristics shown in FIG. 22, and, in Step S63 of the motor limit value setting routine (FIG. 14), the microcomputer 60 sets the upper limit command voltage Vmax by referring to the upper limit command voltage map, instead of setting the upper limit current Imax.

Therefore, when detecting the semi-abnormal state of the motor 20 or the motor drive circuit 40, the microcomputer 60 counts an elapsed time t from the first detection of the semi-abnormal state, and gradually decreases the upper limit command voltage Vmax from an initial value Vmax0 with time, the initial value Vmax0 corresponding to an upper limit command voltage Vmax0 measured in the normal case. Then, when the elapsed time t reaches a stop setting time t1 (S64: Yes), the microcomputer 60 stops the steering assist. Also in Modified Example 2-4, similarly to Modified Example 2-1, the microcomputer 60 stores and holds the timer value t in a non-volatile memory to count an accumulated time.

According to Modified Example 2-4, in the case where the semi-abnormal state of the motor 20 or the motor drive circuit 40 is detected, the upper limit command voltage Vmax corresponding to a temporal change of the internal resistance value is set at the time of this detection, and hence the operation of the motor 20 can be appropriately limited.

Modified Example 2-5

Voltage Limitation Depending on Region where Semi-Abnormality has Occurred

In Modified Example 2-2 described above, the upper limit current Imax is decreased gradually with time, and the upper limit current Imax is calculated with the use of the upper limit current map having characteristics different between the case where the semi-abnormal state of the motor 20 is detected and the case where the semi-abnormal state of the motor drive circuit 40 is detected. In Modified Example 2-5, instead of the upper limit current Imax, the upper limit command voltage Vmax is decreased gradually with time. In this case, the microcomputer 60 executes the same processing as in the internal resistance value determining routine illustrated in FIG. 15, the motor limit value setting routine illustrated in FIG. 16, and the steering assist control routine illustrated in FIG. 21.

Figure 23:
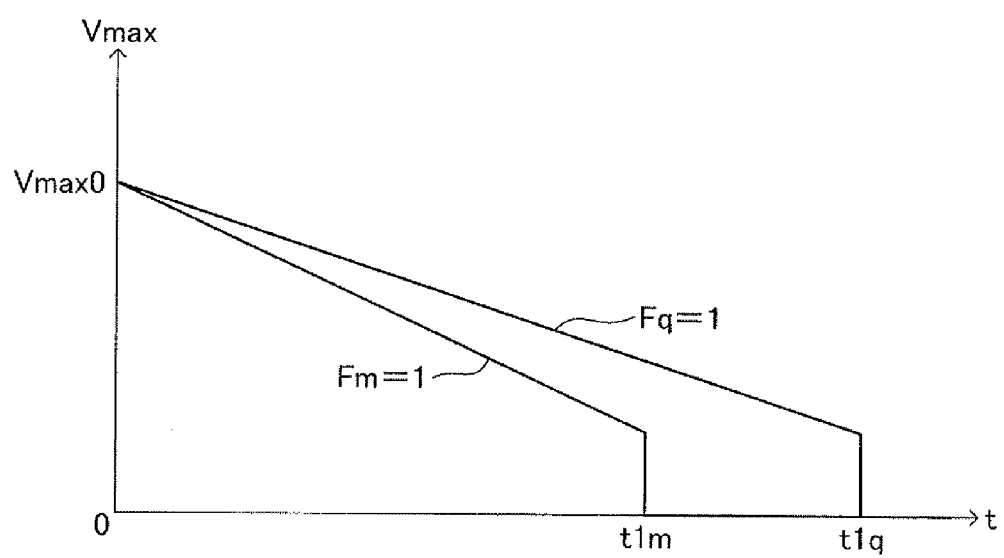
FIG. 23 A graph showing an upper limit command voltage map according to Modified Example 2-5.

Note that, the microcomputer 60 stores an upper limit command voltage map having the characteristics shown in FIG. 23, and, in Steps S84 and S88 of the motor limit value setting routine (FIG. 16), the microcomputer 60 refers to the upper limit command voltage map to set the upper limit command voltage Vmax. In Steps S85 and S89, the microcomputer 60 stops the steering assist at a stop setting time t1$m$ or a stop setting time t1$q$ that is set in the upper limit command voltage map.

The upper limit command voltage map has such characteristics that the upper limit command voltage Vmax decreases gradually from an initial value Vmax0 with time. The characteristics of the upper limit command voltage map are set to be different between the case where the motor semi-abnormality determination flag Fm is set to "1", that is, the case where the semi-abnormal state of the motor 20 is detected, and the case where the circuit semi-abnormality determination flag Fq is set to "1" that is, the case where the semi-abnormal state of the motor drive circuit 40 is detected.

FIG. 23 shows a setting example of the upper limit command voltage Vmax in the case where the remaining lifetime from the detection of the semi-abnormal state of the motor 20 is shorter than the remaining lifetime from the detection of the semi-abnormal state of the motor drive circuit 40. In this example, a stop setting time t1$m$ is set when the semi-abnormal state of the motor 20 is detected, and a stop setting time t1$q$ longer than the stop setting time t1$m$ is set when the semi-abnormal state of the motor drive circuit 40 is detected. Note that, in the case where the relationship of the remaining lifetime between the motor 20 and the motor drive circuit 40 is reverse, the characteristics of the upper limit command voltage map are reversed so that the stop setting time t1m is set to be longer than the stop setting time t1q.

According to Modified Example 2-5, the characteristics of the upper limit command voltage Vmax and the stop setting times t1 are set independently for the case where the motor 20 becomes the semi-abnormal state and the case where the motor drive circuit 40 becomes the semi-abnormal state. In other words, the characteristics of the upper limit command voltage Vmax and the stop setting time t1 are switched depending on the region where the semi-abnormality has occurred. In this manner, an appropriate steering assist corresponding to the degree of degradation of the semi-abnormal region can be executed. Further, an appropriate steering assist executable period corresponding to the remaining lifetime of the semi-abnormal region can be set. As a result, the operation of the motor 20 can be limited more appropriately.

Modified Example 2-6

Limitation on Operation Based on Target Assist Torque

The operation of the motor 20 may be limited in a manner that the target assist torque tr* is decreased as compared to the normal case when the semi-abnormal state of the motor 20 or the motor drive circuit 40 is detected. For example, in Step S2 of the steering assist control routine (FIG. 3), the target assist torque tr* set based on the assist map may be corrected in a manner that the target assist torque tr* is multiplied by a limiting coefficient K ($0 \leq K \leq 1$) and the calculated value (tr*× K) is set as a final target assist torque tr*. In this case, the limiting coefficient K is set to have a value that decreases as the internal resistance value of the motor 20 or the motor drive circuit 40 becomes larger.

Alternatively, an elapsed time t may be measured from the first detection of the semi-abnormal state, and the limiting coefficient K may be gradually decreased from "1", which is the value for the normal case, so that the steering assist is stopped when the elapsed time t reaches the stop setting time t1.

Alternatively, in the case where the semi-abnormal state of the motor 20 or the motor drive circuit 40 is detected, the target assist torque tr* may be set always by using the characteristics of an assist map for high-speed running regardless of the vehicle speed vx (see FIG. 4). In this case, the operation of the motor 20 is limited in a manner that the target assist torque tr is set to be smaller than the one for the normal case.

Modified Example 2-7

Combination with Current Limitation Based on Estimated Temperature

Figure 24:
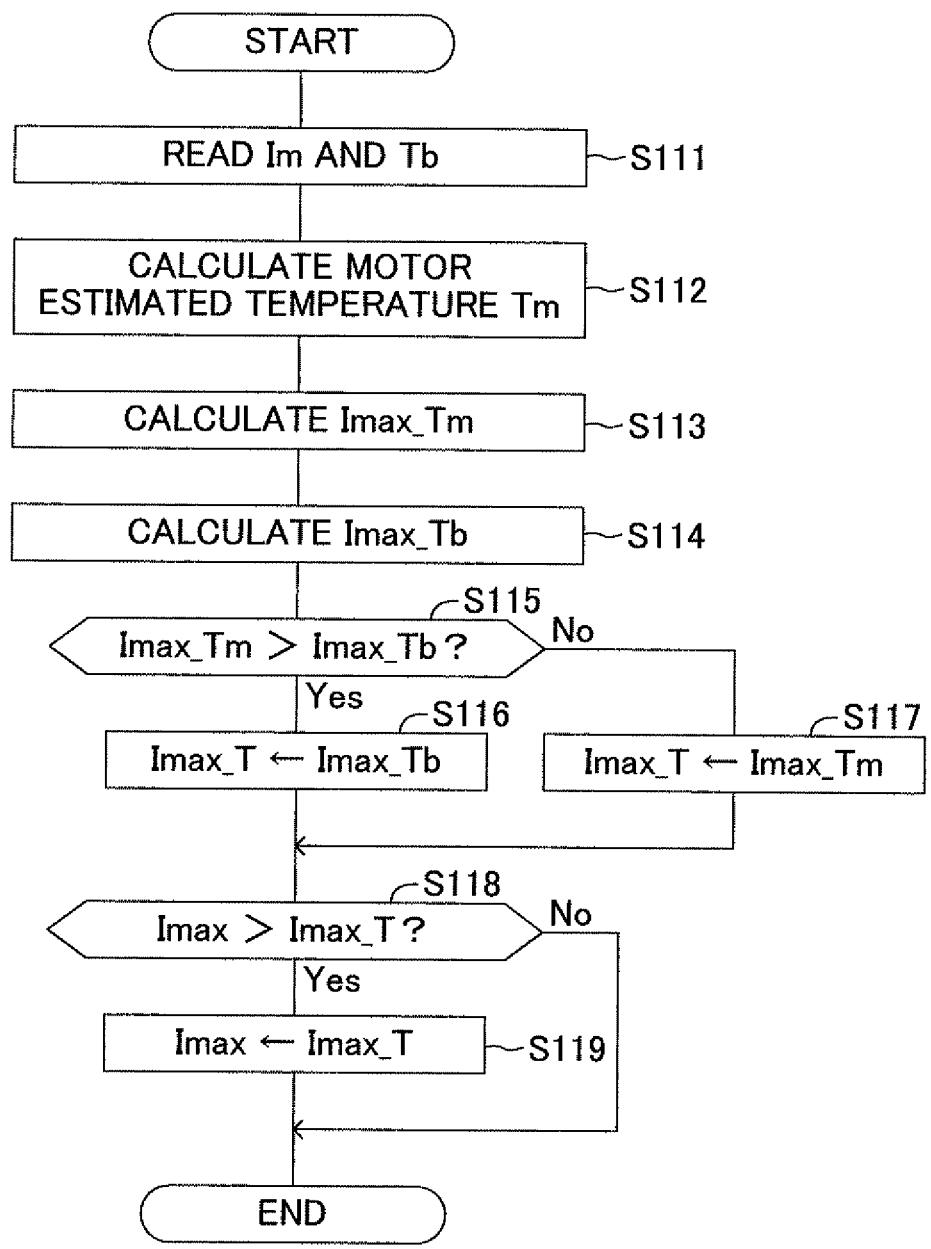
FIG. 24 A flowchart illustrating a motor limit value setting routine according to Modified Example 2-7.
Figure 25:
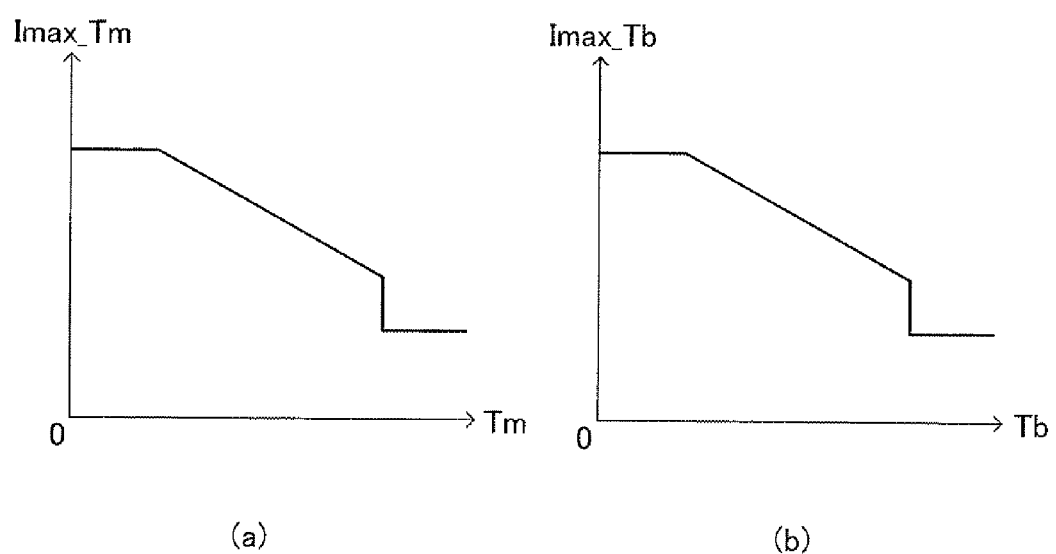
FIG. 25 A graph showing a motor temperature upper limit current map and a graph showing a substrate temperature upper limit current map according to Modified Example 2-7.

In the above-mentioned embodiment, the upper limit current Imax is set based on the internal resistance value Rm of the motor 20 and the internal resistance value Rq of the motor drive circuit 40. Alternatively, however, the upper limit current Imax may be set in consideration of the motor estimated temperature Tm and the substrate temperature Tb in addition to the internal resistance value Rm of the motor 20 and the internal resistance value Rq of the motor drive circuit 40. FIG. 24 illustrates a motor limit value setting routine executed by the microcomputer 60 at predetermined cycles. For executing the motor limit value setting routine, the microcomputer 60 stores a motor temperature upper limit current map that sets the relationship between the motor estimated temperature Tm and an upper limit current Imax_Tm for motor temperature as shown in FIG. 25(a), and a substrate temperature upper limit current map that sets the relationship between the substrate temperature Tb and an upper limit current Imax_Tb for substrate temperature as shown in FIG. 25(b). The motor temperature upper limit current map has such characteristics that the upper limit current Imax_Tm for motor temperature decreases as the motor estimated temperature Tm becomes higher. The substrate temperature upper limit current map has such characteristics that the upper limit current Imax_Tb for substrate temperature decreases as the substrate temperature Tb becomes higher.

The motor limit value setting routine (FIG. 24) is repeated at predetermined short cycles in parallel with the steering assist control routine. In Step S111, the microcomputer 60 reads the motor actual current Im detected by the current sensor 31 and the substrate temperature Tb detected by the substrate temperature sensor 35. Subsequently, in Step S112, the microcomputer 60 calculates the motor estimated temperature Tm. The motor estimated temperature Tm indicates a temperature increase amount due to heat generation of the motor 20, and can be calculated by using a square-integrated value of the motor actual current Im detected by the current sensor 31. A current square-integrated value SUM for temperature estimation is calculated by Expression (11) below.

$$SUM(n)=SUM(n-1)+Ktm \cdot (Im^2-SUM(n-1)) \qquad (11)$$

In Expression (11), Ktm represents a predetermined coefficient indicating how the temperature of the motor 20 changes in accordance with the square value of the motor actual current Im. Further, (n) means a value that is calculated by the current processing in the upper limit current Imax setting routine repeatedly executed at predetermined short cycles. Therefore, SUM(n) is a current square-integrated value for temperature estimation that is to be obtained by the current calculation, and SUM(n−1) is a current square-integrated value for temperature estimation that is calculated in the previous calculation cycle.

As expressed by Expression (12) below, the microcomputer 60 calculates the motor estimated temperature Tm by multiplying the current square-integrated value SUM(n) for temperature estimation by a motor temperature gain Gm.

$$Tm=Gm \cdot SUM(n) \qquad (12)$$

In this calculation, an initial value of SUM(n−1) is necessary. For example, the initial value of SUM(n−1) may be obtained as follows. A current square-integrated value SUM (n) for temperature estimation measured at the end of the steering assist control routine is stored in a non-volatile memory, and, when the next steering assist control routine is started, a temperature change amount (ΔT) caused by heat dissipation is subtracted from the stored current square-integrated value SUM(n) for temperature estimation. For example, the temperature change amount (ΔT) can be calculated based on a temperature variation amount of the substrate temperature Tb. In the case where an operation stop period of the motor 20 is long, the initial value of SUM(n−1) can be set to zero.

Subsequently, in Step S113, the microcomputer 60 refers to the motor temperature upper limit current map to calculate the upper limit current Imax_Tm for motor temperature based on the motor estimated temperature Tm. Subsequently, in Step S114, the microcomputer 60 refers to the substrate temperature upper limit current map to calculate the upper limit current Imax_Tb for substrate temperature based on the substrate temperature Tb.

Subsequently, in Step S115, the microcomputer 60 compares the upper limit current Imax_Tm for motor temperature and the upper limit current Imax_Tb for substrate temperature, and sets a smaller one as the upper limit current Imax_T for temperature in Step S116 or S117.

Subsequently, in Step S118, the microcomputer 60 determines whether or not the upper limit current Imax set in Step S45 or S46 of the motor limit value setting routine in the embodiment is larger than the upper limit current Imax_T for temperature. When the upper limit current Imax is larger than the upper limit current Imax_T for temperature (S118: Yes), in Step S119, the microcomputer 60 changes the upper limit current Imax to the value of the upper limit current Imax_T for temperature (Imax←Imax_T). On the other hand, when the upper limit current Imax is equal to or smaller than the upper limit current Imax_T for temperature (S118: No), the microcomputer 60 skips the processing of Step S119.

After setting the upper limit current Imax in this manner, the microcomputer 60 finishes the motor limit value setting routine once. In Step S4 of the steering assist control routine, the microcomputer 60 reads the upper limit current Imax set in this motor limit value setting routine.

According to Modified Example 2-7, the upper limit current of the motor 20 is set based on the internal resistance value Rm of the motor 20 and the motor estimated temperature Tm while the upper limit current of the motor drive circuit 40 is set based on the internal resistance value Rq of the motor drive circuit 40 and the substrate temperature Tb, and the upper limit current of the motor 20 is set with the use of a smaller one of the upper limit currents. Therefore, the motor 20 and the motor drive circuit 40 can be protected more properly to prolong the lifetime.

Modified Example 2-8

Limitation on Operation Based on Temperature Gain

In the above-mentioned embodiment, when the semi-abnormal state of the motor 20 or the motor drive circuit 40 is detected, the upper limit current Imax corresponding to the internal resistance value is set to limit the operation of the motor 20. According to Modified Example 2-8, however, the upper limit current Imax is changed by setting a temperature gain corresponding to the internal resistance value.

In Modified Example 2-8, the microcomputer 60 sets the upper limit current Imax to be used in Step S4 of the steering assist control routine based on the motor estimated temperature Tm and the substrate temperature Tb. For example, the microcomputer 60 performs the same processing as in Steps S111 to S117 according to Modified Example 2-7 to calculate an upper limit current Imax_T for temperature, and sets the upper limit current Imax_T for temperature as the upper limit current Imax to be used in the steering assist control routine.

In this case, the microcomputer 60 calculates the motor estimated temperature Tm in Step S112 by using a motor temperature gain Gm that is set in accordance with the internal resistance value Rm of the motor 20. The motor estimated temperature Tm is calculated by Expression (12) below.

$$Tm = Gm \cdot SUM(n) \tag{12}$$

Therefore, the motor estimated temperature Tm can be adjusted by varying the motor temperature gain Gm of Expression (12) in accordance with the internal resistance value Rm.

Figure 26:
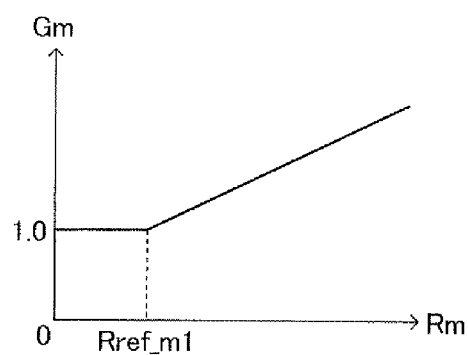
FIG. 26 A graph showing a motor temperature gain map and a graph showing a substrate temperature gain map according to Modified Example 2-8.
Figure 26:
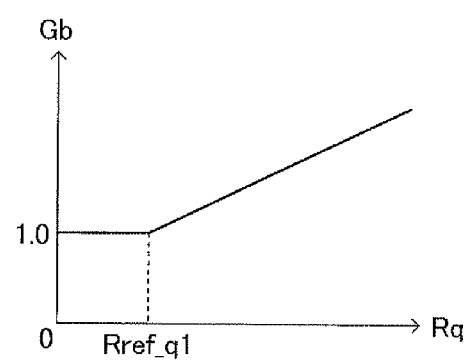

The microcomputer 60 stores a motor temperature gain map having the characteristics shown in FIG. 26(a). The microcomputer 60 refers to the motor temperature gain map to calculate the motor temperature gain Gm ($\geq 1$) based on the internal resistance value Rm. The motor temperature gain map has such characteristics that the motor temperature gain Gm increases as the internal resistance value Rm of the motor 20 becomes larger. Therefore, the motor estimated temperature Tm becomes higher as the internal resistance value Rm of the motor 20 becomes larger.

In the case where the upper limit current Imax_Tb for substrate temperature is set in Step S114, the microcomputer 60 corrects the substrate temperature Tb with a substrate temperature gain Gb. Specifically, as expressed by Expression (13) below, a value obtained by multiplying the substrate temperature Tb detected by the substrate temperature sensor 35 by the substrate temperature gain Gb is set as a final substrate temperature Tb.

$$Tb = Gb \cdot Tb \tag{13}$$

Therefore, the substrate temperature Tb can be adjusted by varying the substrate temperature gain Gb of Expression (13) in accordance with the internal resistance value Rq of the motor drive circuit 40.

The microcomputer 60 stores a substrate temperature gain map having the characteristics shown in FIG. 26(b). The microcomputer 60 refers to the substrate temperature gain map to calculate the substrate temperature gain Gb ($\geq 1$) based on the internal resistance value Rq. The substrate temperature gain map has such characteristics that the substrate temperature gain Gb increases as the internal resistance value Rq of the motor drive circuit 40 becomes larger. Therefore, the substrate temperature Tb becomes higher as the internal resistance value Rq of the motor drive circuit 40 becomes larger.

According to Modified Example 2-8, in the case where the internal resistance value Rm of the motor 20 increases to become the semi-abnormal state, the motor estimated temperature Tm increases in calculation, and the upper limit current Imax decreases correspondingly (see FIG. 25(a)). Therefore, the current flowing through the motor 20 can be limited as compared to the normal case. On the other hand, in the case where the internal resistance value Rq of the motor drive circuit 40 increases to become the semi-abnormal state, the substrate temperature Tb increases in calculation, and the upper limit current Imax decreases correspondingly (see FIG. 25(b)). Therefore, the current flowing through the motor 20 can be limited as compared to the normal case.

The motor temperature gain map and the substrate temperature gain map can be set to have independent characteristics, and hence the operation of the motor 20 can be properly limited in accordance with the region where the semi-abnormal state has occurred.

Modified Example 3

Determination of Semi-Abnormal State

In the above-mentioned embodiment, the semi-abnormal state is determined by comparison between the measured internal resistance values Rm and Rq and the preset determination values ((Rref_m1, Rref_m2), (Rref_q1, Rref_q2)) (see S40 and S42). Alternatively, however, various kinds of methods can be employed to determine the semi-abnormal state.

Modified Example 3-1

Determination Based on Initial Value of Internal Resistance Value

For example, an internal resistance value measured first may be set as an initial value, and the semi-abnormal state may be determined based on a fluctuation from the initial value. In this case, internal resistance values measured first are stored in a non-volatile memory (not shown) as initial values Rm0 and Rq0, and after that, the measured internal resistance values Rm and Rq are compared against the initial values Rm0 and Rq0 in Step S40 and Step S42, respectively, for every measurement of the internal resistance values.

The determination is made in a manner that, for example, an increase amount (Rm−Rm0, Rq−Rq0) or an increase rate (Rm/Rm0, Rq/Rq0) of the measured internal resistance value with respect to the initial value is calculated, and it is determined that the internal resistance value is in the semi-abnormal state when the increase amount or the increase rate exceeds a preset first reference value and that the internal resistance value is in the abnormal state when the increase amount or the increase rate exceeds a second reference value larger than the first reference value. Note that, the initial value Rq0 of the internal resistance values of the switching elements Q1, Q2, Q3, and Q4 may be, for example, an arbitrary value of the internal resistance values Rq1, Rq2, Rq3, and Rq4 measured first, or may be an average value, a maximum value, or a minimum value thereof. Alternatively, increase amounts or increase rates of the internal resistance values Rq1, Rq2, Rq3, and Rq4 of the individual switching elements Q1, Q2, Q3, and Q4 may be calculated to perform the determination based on the increase amounts or the increase rates. In this case, a maximum value of the four increase amounts or increase rates is compared against the reference value.

Modified Example 3-2

Temperature Correction of Determination Value

The determination values ((Rref_m1, Rref_m2), (Rref_q1, Rref_q2)) for determining the measured internal resistance values Rm and Rq may be subjected to temperature correction. The microcomputer 60 is provided with the function of estimating the temperature Tm of the motor 20 based on the motor actual current Im and the function of detecting the substrate temperature Tb by the substrate temperature sensor 35. Therefore, the determination values (Rref_m1 and Rref_m2) for determining the semi-abnormal state of the motor 20 can be corrected based on the estimated temperature Tm of the motor 20. Further, the determination values (Rref_q1 and Rref_q2) for determining the semi-abnormal state of the motor drive circuit 40 can be corrected based on the substrate temperature Tb.

The relationship between the estimated temperature Tm of the motor 20 and the internal resistance value Rm and the relationship between the substrate temperature tb and the internal resistance value Rq can be obtained in advance by experiment. Therefore, a correction map showing the relationship between the estimated temperature Tm and a correction coefficient and a correction map showing the relationship between the substrate temperature Tb and a correction coefficient can be stored in the microcomputer 60.

The microcomputer 60 reads the estimated temperature Tm of the motor 20 before determining in Step S40 whether the motor 20 is normal, abnormal, or semi-abnormal based on the motor internal resistance value Rm. Then, the microcomputer 60 refers to the correction map to set a correction coefficient corresponding to the estimated temperature Tm, and multiplies the determination value (Rref_m1, Rref_m2) by the correction coefficient to obtain a new determination value (Rref_ml, Rref_m2). The microcomputer 60 uses the corrected determination value (Rref_m1, Rref_m2) to determine whether the motor 20 is normal, abnormal, or semi-abnormal.

Note that, the estimated temperature Tm of the motor 20 can be calculated by the method described above in Modified Example 2-7.

Similarly, the microcomputer 60 reads the substrate temperature Tb detected by the substrate temperature sensor 35 before determining in Step S42 whether the motor drive circuit 40 is normal, abnormal, or semi-abnormal based on the circuit internal resistance value Rq. Then, the microcomputer 60 refers to the correction map to set a correction coefficient corresponding to the substrate temperature Tb, and multiplies the determination value (Rref_q1, Rref_q2) by the correction coefficient to obtain a new determination value (Rref_q1, Rref_q2). The microcomputer 60 uses the corrected determination value (Rref_q1, Rref_q2) to determine whether the motor drive circuit 40 is normal, abnormal, or semi-abnormal.

According to Modified Example 3-2, the state (normal, abnormal, or semi-abnormal) relating to the internal resistances of the motor 20 and the motor drive circuit 40 can be determined more accurately.

Modified Example 3-3

Determination Based on Voltage Change

In the above-mentioned embodiment, the internal resistance value Rm of the motor 20 and the internal resistance value Rq of the motor drive circuit 40 are measured. However, it is not always necessary to measure the internal resistance values. For example, the semi-abnormal state can be detected based on a temporal change of the inter-terminal voltage of the motor 20.

Figure 27:
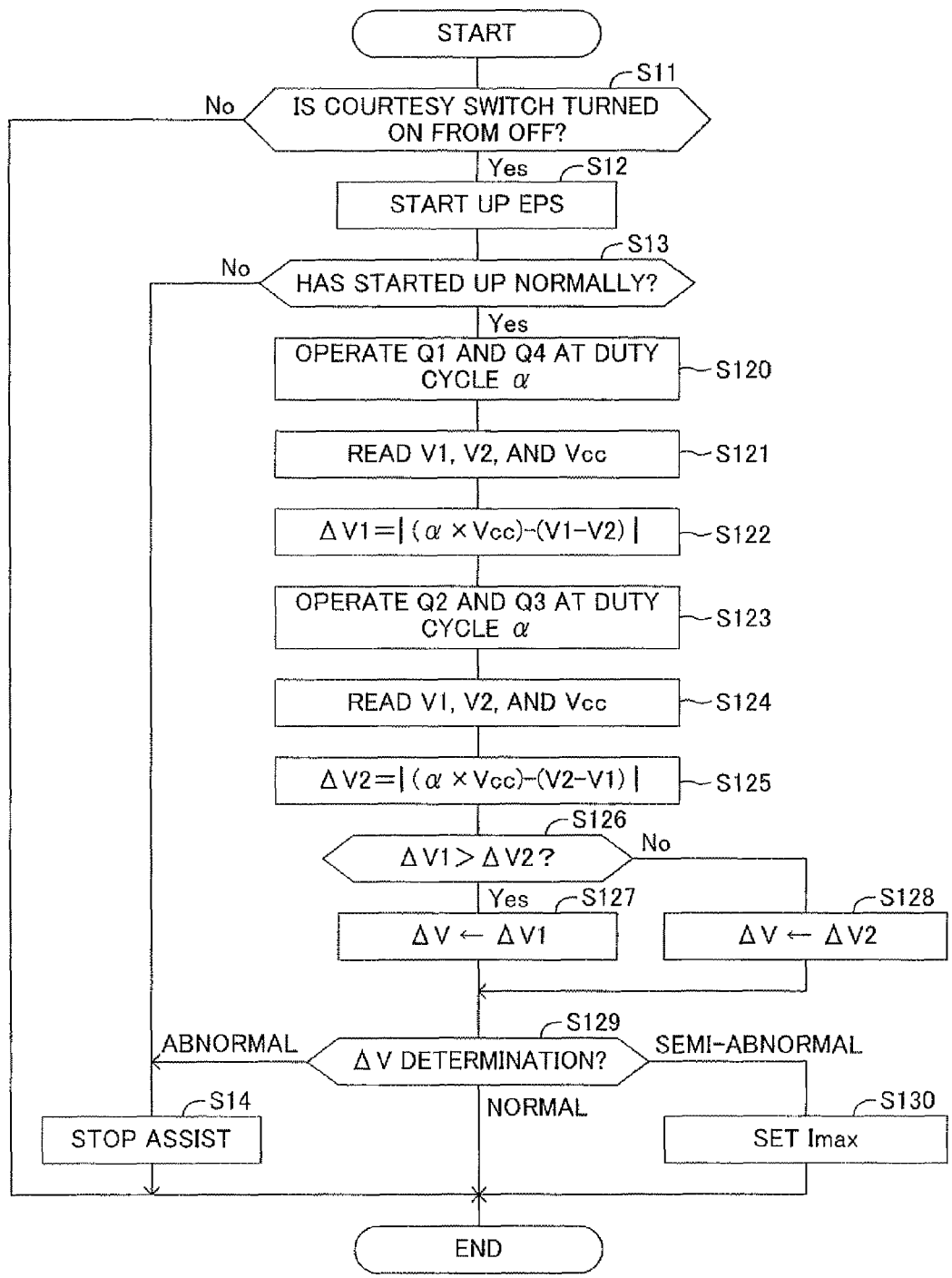
FIG. 27 A flowchart illustrating a motor limit value setting routine according to Modified Example 3-3.

In Modified Example 3-3, the microcomputer 60 executes a motor limit value setting routine illustrated in FIG. 27. The motor limit value setting routine according to Modified Example 3-3 is obtained by changing the processing of Step S20 to Step S46 of the motor limit value setting routine (FIG. 6) according to the embodiment. In the following, the same processing in FIG. 27 as in the embodiment is denoted by the same step number as in the embodiment, and description thereof is omitted.

When the system of the electric power steering device 1 has started up normally (S13: Yes), in Step S120, the microcomputer 60 subsequently operates the switching elements Q1 and Q4 to be turned ON and OFF at a preset duty cycle α. Subsequently, in Step S121, the microcomputer 60 measures the first motor terminal voltage V1, the second motor terminal voltage V2, and the power supply voltage Vcc at that time. Subsequently, in Step S122, the microcomputer 60 calculates a deviation $\Delta V1$ ($=|(\alpha \times Vcc)-(V1-V2)|$) between a value ($\alpha \times Vcc$) obtained by multiplying the power supply voltage Vcc by the duty cycle α and the inter-terminal voltage (V1−V2) of the motor 20.

Subsequently, in Step S123, the microcomputer 60 operates the switching elements Q2 and Q3 to be turned ON and OFF at the duty cycle α. Subsequently, in Step S124, the microcomputer 60 measures the first motor terminal voltage V1, the second motor terminal voltage V2, and the power supply voltage Vcc at that time. Subsequently, in Step S125, the microcomputer 60 calculates a deviation $\Delta V2$ ($=|(\alpha \times Vcc)-(V2-V1)|$) between a value ($\alpha \times Vcc$) obtained by multiplying the power supply voltage Vcc by the duty cycle α and the inter-terminal voltage (V2−V1) of the motor 20.

Subsequently, in Steps S126 to S128, the microcomputer 60 sets a larger one of the deviation $\Delta V1$ and the deviation $\Delta V2$ as a deviation $\Delta V$. Note that, the deviation $\Delta V1$ and the deviation ΔV2 may be measured alternately a plurality of times to measure average values thereof.

When both the internal resistance value of the motor 20 and the internal resistance value of the motor drive circuit 40 are normal, the deviation ΔV is a small value. However, the deviation ΔV increases when the internal resistance value of the motor 20 or the internal resistance value of the motor drive circuit 40 increases. Utilizing this relationship, in Step S129, the microcomputer 60 determines whether a motor energization path formed of the motor 20 and the motor drive circuit 40 is normal, semi-abnormal, or abnormal based on the deviation ΔV. For example, a deviation ΔV measured first is stored in a non-volatile memory (not shown) as an initial value ΔV0, and after that, a deviation ΔV calculated in Step S122 is compared against the initial value ΔV0 for determination.

The determination is made in a manner that, for example, an increase amount (ΔV−ΔV0) or an increase rate (ΔV/ΔV0) of the deviation ΔV with respect to the initial value ΔV0 is calculated, and it is determined that the motor energization path is in the semi-abnormal state when the increase amount or the increase rate exceeds a preset first reference value and that the motor energization path is in the abnormal state when the increase amount or the increase rate exceeds a second reference value larger than the first reference value. Note that, the determination may be made by comparing the deviation ΔV against a preset set value ΔV0, instead of the initial value ΔV0.

When detecting the semi-abnormal state in Step S129, the microcomputer sets the upper limit current Imax in Step S130. In this case, the upper limit current Imax is set to have a value that decreases as the increase amount (ΔV−ΔV0) or the increase rate (ΔV/ΔV0) becomes larger.

Modified Example 4

Alarming of Semi-abnormality

A warning lamp 94 (see FIG. 1) may be connected to the assist ECU 100 so that the warning lamp 94 is turned ON when the semi-abnormal state of the motor 20 or the motor drive circuit 40 is detected. This configuration enables a driver to know the abnormality at a time when the motor 20 or the motor drive circuit 40 becomes semi-abnormal. Therefore, the repair can be arranged at an appropriate timing (before a failure occurs in a component).

While the electric power steering device 1 according to the embodiment and the modified examples has been described above, the present invention is not intended to be limited to the above-mentioned embodiment and modified examples, and various changes are possible within the range not departing from the object of the present invention.

For example, the embodiment of the present invention employs the configuration in which both the internal resistance values of the motor 20 and the motor drive circuit 40 are measured to limit the operation of the motor 20 in accordance with the measured internal resistance values. Alternatively, however, it is possible to employ another configuration in which any one of the internal resistance values of the motor 20 and the motor drive circuit 40 is measured to limit the operation of the motor 20 in accordance with the measured internal resistance value. For example, in the case where the motor drive circuit 40 is higher in reliability than the motor 20, the operation of the motor 20 may be limited in accordance with the internal resistance value of the motor 20 while the measurement, the determination, and the motor operation limitation relating to the internal resistance value of the motor drive circuit 40 (S20, S40, and S41) are omitted, and, on the other hand, in the case where the motor 20 is higher in reliability than the motor drive circuit 40, the operation of the motor 20 may be limited in accordance with the internal resistance value of the motor drive circuit 40 while the measurement, the determination, and the motor operation limitation relating to the internal resistance value of the motor 20 (S30, S42, and S43) are omitted.

In the embodiment of the present invention, MOS-FETs are used as the switching elements Q1, Q2, Q3, and Q4 used in the motor drive circuit (H bridge circuit) 40. However, the present invention is not limited thereto, and other switching semiconductor elements may be used.

In the embodiment of the present invention and the modified examples, various kinds of maps are used to derive variables. However, a calculation formula using a function or the like may be used instead of the maps.

In the embodiment of the present invention, the stop setting time is not provided. Alternatively, however, for example, as described in Modified Examples 2-1, 2-2, 2-4, 2-5, and 2-6, if the semi-abnormal state is detected, the steering assist may be stopped when an elapsed time from the detection timing has reached a stop setting time.

In Modified Example 3-2, the determination values ((Rref_m1, Rref_m2), (Rref_q1, Rref_q2)) to be compared against the measured internal resistance values Rm and Rq are subjected to temperature correction. Alternatively, however, the measured internal resistance values Rm and Rq may be subjected to temperature correction.

In the embodiment of the present invention described above, the electric power steering device 1 is a column-assist electric power steering device that applies torque generated by the motor 20 to the steering shaft 12. Alternatively, however, a rack-assist electric power steering device that applies the torque generated by the motor to the rack bar 14 may be used.

The invention claimed is:
1. An electric power steering device, comprising:
steering torque detection means for detecting a steering torque input from a steering wheel;
a motor provided in a steering mechanism;
a motor drive circuit comprising a switching element for controlling energization of the motor;
control amount calculation means for calculating a control amount of the motor based on the steering torque detected by the steering torque detection means;
switch control means for controlling the switching element of the motor drive circuit in accordance with the control amount calculated by the control amount calculation means, thereby generating a steering assist torque from the motor;
internal resistance value measurement means for energizing the motor so as not to rotate the steering wheel, thereby measuring an internal resistance value of an energization path that is a circuit through which a current flows, including motor drive circuit and the motor;
semi-abnormal state detection means for detecting a semi-abnormal state relating to an internal resistance of the energization path, in which the internal resistance value measured by the internal resistance value measurement means becomes a semi-abnormal value that exceeds a normal range and is out of an abnormal range in which the motor is intended to be stopped; and
semi-abnormal occasion control amount limiting means for limiting, when the semi-abnormal state is detected, the control amount of the motor so that the energization of the motor for generating the steering assist torque is limited as compared to a case where the internal resistance value falls within the normal range.

2. An electric power steering device according to claim 1, wherein;
the internal resistance value measurement means is configured to measure an internal resistance value of the motor and an internal resistance value of the motor drive circuit; and
the semi-abnormal state detection means is configured to detect a semi-abnormal state relating to an internal resistance of the motor, in which the internal resistance value of the motor, which is measured by the internal resistance value measurement means, becomes a semi-abnormal value that exceeds the normal range and is out of the abnormal range, and detect a semi-abnormal state relating to an internal resistance of the motor drive circuit in which the internal resistance value of the motor drive circuit, which is measured by the internal resistance value measurement means, becomes a semi-abnormal value that exceeds the normal range and is out of the abnormal range.

3. An electric power steering device according to claim 2, further comprising limiting degree independently setting means for setting a limiting degree of the energization of the motor independently for a case where the internal resistance value of the motor becomes the semi-abnormal value and a case where the internal resistance value of the motor drive circuit becomes the semi-abnormal value.

4. An electric power steering device according to claim 2, wherein:
the motor comprises a brush DC motor;
the motor drive circuit comprises an H bridge circuit including:
a forward rotation energization path in which a current flows when the motor is driven in a forward rotation direction; and
a backward rotation energization path in which a current flows when the motor is driven in a backward rotation direction; and
the internal resistance value measurement means is configured to measure an internal resistance value of a forward rotation switching element provided in the forward rotation energization path, an internal resistance value of a backward rotation switching element provided in the backward rotation energization path, and the internal resistance value of the motor.

5. An electric power steering device according to claim 4, wherein the internal resistance value measurement means is configured to alternately turn ON the forward rotation switching element and the backward rotation switching element, to measure the internal resistance value of the forward rotation switching element when the forward rotation switching element is turned ON, and measure the internal resistance value of the backward rotation switching element when the backward rotation switching element is turned ON.

6. An electric power steering device according to claim 1, wherein the semi-abnormal occasion control amount limiting means is configured to set an upper limit value of the current to be supplied to the motor so that the upper limit value becomes smaller as the internal resistance value measured by the internal resistance value measurement means becomes larger.

7. An electric power steering device according to claim 1, wherein the semi-abnormal occasion control amount limiting means is configured to set an upper limit value of a voltage to be applied to the motor so that the upper limit value becomes smaller as the internal resistance value measured by the internal resistance value measurement means becomes larger.

8. An electric power steering device according to claim 1, wherein the semi-abnormal occasion control amount limiting means is configured to set an upper limit value of the current to be supplied to the motor so that the upper limit value gradually decreases with time in a case where the semi-abnormal state detection means detects the semi-abnormal state.

9. An electric power steering device according to claim 1, wherein the semi-abnormal occasion control amount limiting means is configured to set an upper limit value of a voltage to be applied to the motor so that the upper limit value gradually decreases with time in a case where the semi-abnormal state detection means detects the semi-abnormal state.

10. An electric power steering device according to claim 1, further comprising time limiting means for inhibiting the energization of the motor when an elapsed time from the detection of the semi-abnormal state by the semi-abnormal state detection means reaches a preset stop time.

11. An electric power steering device according to claim 10, further comprising stop time setting means for setting the stop time independently for a case where the internal resistance value of the motor becomes the semi-abnormal value and a case where the internal resistance value of the motor drive circuit becomes the semi-abnormal value.

12. An electric power steering device according to claim 1, wherein the internal resistance value measurement means is configured to start measuring the internal resistance value based on a door open/close signal indicating an open/close state of a vehicle door or a seating signal indicating a seating state of a driver on a driver's seat.

13. An electric power steering device according to claim 1, wherein the internal resistance value measurement means is configured to determine an internal resistance value of the switching element by calculation based on a power supply voltage to be applied to the motor drive circuit, a motor current flowing through the motor, and respective terminal voltages of the motor or an inter-terminal voltage of the motor.

14. An electric power steering device according to claim 1, wherein the internal resistance value measurement means is configured to determine the internal resistance value of the motor by calculation based on a motor current flowing through the motor and an inter-terminal voltage of the motor.

* * * * *